US008219584B2

(12) United States Patent
Starr

(10) Patent No.: US 8,219,584 B2
(45) Date of Patent: Jul. 10, 2012

(54) USER ACCESS TO ITEM INFORMATION

(75) Inventor: Robert J. Starr, Decatur, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 124 days.

(21) Appl. No.: 11/304,036

(22) Filed: Dec. 15, 2005

(65) Prior Publication Data

US 2007/0143256 A1    Jun. 21, 2007

(51) Int. Cl.
G06F 17/30    (2006.01)
(52) U.S. Cl. ........................................................ 707/781
(58) Field of Classification Search ............... 707/3, 812, 707/781, 999.002
See application file for complete search history.

(56) References Cited

U.S. PATENT DOCUMENTS

| 5,418,354 | A | | 5/1995 | Halling et al. |
| 5,478,989 | A | | 12/1995 | Shepley |
| 5,732,074 | A | * | 3/1998 | Spaur et al. ................... 370/313 |
| 5,887,271 | A | | 3/1999 | Powell |
| 5,913,210 | A | * | 6/1999 | Call ................................ 707/4 |
| 5,938,727 | A | * | 8/1999 | Ikeda ........................... 709/218 |
| 5,950,173 | A | * | 9/1999 | Perkowski ...................... 705/26 |
| 5,971,277 | A | * | 10/1999 | Cragun et al. .......... 235/462.01 |
| 5,992,752 | A | * | 11/1999 | Wilz et al. ............... 235/472.01 |
| 6,064,981 | A | | 5/2000 | Barni et al. |
| 6,092,035 | A | | 7/2000 | Kurachi et al. |
| 6,101,483 | A | | 8/2000 | Petrovich et al. |
| 6,134,548 | A | * | 10/2000 | Gottsman et al. ................. 707/5 |
| 6,134,578 | A | * | 10/2000 | Ehlig et al. .................... 718/100 |
| 6,317,718 | B1 | | 11/2001 | Fano |
| 6,349,337 | B1 | | 2/2002 | Parsons, Jr. et al. |
| 6,356,905 | B1 | | 3/2002 | Gershman |
| 6,375,077 | B1 | | 4/2002 | Hankins |
| 6,397,212 | B1 | | 5/2002 | Biffar |
| 6,446,871 | B1 | | 9/2002 | Buckley et al. |
| 6,604,681 | B1 | | 8/2003 | Burke et al. |
| 6,625,581 | B1 | | 9/2003 | Perkowski |
| 6,641,037 | B2 | * | 11/2003 | Williams ...................... 235/383 |
| 6,652,455 | B1 | | 11/2003 | Kocher |
| 6,704,716 | B1 | | 3/2004 | Force |
| 6,796,507 | B2 | * | 9/2004 | Bean et al. ............... 235/462.14 |
| 6,814,282 | B2 | | 11/2004 | Seifert et al. |
| 6,871,198 | B2 | * | 3/2005 | Neal et al. ......................... 707/3 |
| 7,040,541 | B2 | | 5/2006 | Swartz et al. |
| 7,062,491 | B2 | * | 6/2006 | McNulty et al. ................ 707/10 |
| 7,063,263 | B2 | * | 6/2006 | Swartz et al. ............ 235/472.02 |

(Continued)

OTHER PUBLICATIONS

Starr; Non-Final Rejection mailed May 22, 2008 for U.S. Appl. No. 11/304,338, filed Dec. 15, 2005.

(Continued)

Primary Examiner — Kimberly Wilson
Assistant Examiner — Mohammed R Uddin
(74) Attorney, Agent, or Firm — Thomas, Kayden, Horstemeyer & Risley, LLP

(57) ABSTRACT

Included is a user device for communicating product information. The user device might include a data storage device and a product identifier input device configured to receive a product identifier. Also included in the user device is logic configured to retrieve at least one user preference, logic configured to retrieve information regarding a product related to the product identifier from a data network, and logic configured to compare the at least one user preference with at least a portion of the information related to the product.

23 Claims, 34 Drawing Sheets

U.S. PATENT DOCUMENTS

| | | | |
|---|---|---|---|
| 7,092,943 | B2 * | 8/2006 | Roese et al. .......................... 1/1 |
| 7,139,728 | B2 | 11/2006 | Rigole |
| 7,165,721 | B2 | 1/2007 | Wagner et al. |
| 7,185,818 | B2 * | 3/2007 | Salvato .................... 235/462.45 |
| 7,200,566 | B1 | 4/2007 | Moore et al. |
| 7,296,011 | B2 | 11/2007 | Chaudhuri et al. |
| 7,418,447 | B2 | 8/2008 | Caldwell et al. |
| 8,140,406 | B2 | 3/2012 | Ruckart et al. |
| 2001/0049632 | A1 | 12/2001 | Rigole |
| 2001/0056359 | A1 * | 12/2001 | Abreu .............................. 705/3 |
| 2002/0001372 | A1 * | 1/2002 | Katz .......................... 379/93.12 |
| 2002/0007322 | A1 | 1/2002 | Stromberg |
| 2002/0035501 | A1 | 3/2002 | Handel |
| 2002/0079368 | A1 * | 6/2002 | Hankins ...................... 235/383 |
| 2002/0087522 | A1 * | 7/2002 | MacGregor et al. ............... 707/3 |
| 2002/0103740 | A1 | 8/2002 | Maroney |
| 2002/0107756 | A1 | 8/2002 | Hammons et al. |
| 2002/0120519 | A1 | 8/2002 | Martin |
| 2002/0138331 | A1 | 9/2002 | Hosea |
| 2002/0194081 | A1 | 12/2002 | Perkowski |
| 2003/0004821 | A1 | 1/2003 | Dutta et al. |
| 2003/0041098 | A1 * | 2/2003 | Lortz ............................ 709/203 |
| 2003/0061202 | A1 * | 3/2003 | Coleman ........................... 707/3 |
| 2003/0065636 | A1 * | 4/2003 | Peyrelevade ..................... 706/62 |
| 2003/0078929 | A1 * | 4/2003 | McNulty et al. ................ 707/10 |
| 2003/0132298 | A1 * | 7/2003 | Swartz et al. ............ 235/472.02 |
| 2003/0164819 | A1 | 9/2003 | Waibel |
| 2003/0167172 | A1 | 9/2003 | Johnson et al. |
| 2003/0229552 | A1 | 12/2003 | Lebaric et al. |
| 2004/0060986 | A1 * | 4/2004 | Bean et al. ............... 235/462.14 |
| 2004/0104271 | A1 | 6/2004 | Martucci et al. |
| 2004/0210479 | A1 | 10/2004 | Perkowski |
| 2005/0010475 | A1 | 1/2005 | Perkowski |
| 2005/0019980 | A1 | 1/2005 | Kurosawa et al. |
| 2005/0031092 | A1 | 2/2005 | Umemura et al. |
| 2005/0040230 | A1 * | 2/2005 | Swartz et al. ................. 235/383 |
| 2005/0055281 | A1 | 3/2005 | Williams |
| 2005/0160004 | A1 * | 7/2005 | Moss et al. ...................... 705/14 |
| 2005/0187967 | A1 * | 8/2005 | Couch et al. .................. 707/102 |
| 2005/0203727 | A1 | 9/2005 | Heiner et al. |
| 2005/0251641 | A1 * | 11/2005 | Camilli et al. ................ 711/170 |
| 2006/0015435 | A1 | 1/2006 | Nathanson |
| 2006/0047615 | A1 | 3/2006 | Ravin |
| 2006/0149653 | A1 | 7/2006 | Davis et al. |
| 2006/0200480 | A1 * | 9/2006 | Harris et al. .................. 707/101 |
| 2006/0237532 | A1 * | 10/2006 | Scott-Leikach et al. ...... 235/383 |
| 2006/0248554 | A1 | 11/2006 | Priddy |
| 2007/0005990 | A1 | 1/2007 | Sathish |
| 2008/0021810 | A1 | 1/2008 | Pappas et al. |
| 2008/0071692 | A1 | 3/2008 | Jain |
| 2008/0147534 | A1 | 6/2008 | Ephrati et al. |

OTHER PUBLICATIONS

Starr; U.S. Appl. No. 11/304,338, filed Dec. 15, 2005.
Ruckart; U.S. Appl. No. 11/624,360, filed Jan. 18, 2007.
Starr; Non-Final Rejection mailed Mar. 4, 2009 for U.S. Appl. No. 11/304,338, filed Dec. 15, 2005.
Starr; Final Rejection mailed Oct. 24, 2008 for U.S. Appl. No. 11/304,338, filed Dec. 15, 2005.
Anderson; Non-Final Rejection mailed Jun. 16, 2009 for U.S. Appl. No. 11/282,581, filed Nov. 18, 2005.
Starr; Final Office Action mailed Sep. 14, 2009 for U.S. Appl. No. 11/304,338, filed Dec. 15, 2005.
Starr; Non-final rejection mailed Jan. 20, 2010 for U.S. Appl. No. 11/304,338, filed Dec. 15, 2005.
Starr; Final Office Action mailed May 26, 2010 for U.S. Appl. No. 11/304,338, filed Dec. 15, 2005.
Ruckart; Non-Final Office Action mailed Sep. 7, 2010 for U.S. Appl. No. 11/624,360, filed Jan. 18, 2007.
Ruckart; Final Office Action mailed Feb. 3, 2011 for U.S. Appl. No. 11/624,360, filed Jan. 18, 2007.
Ruckart; Notice of Allowance mailed Nov. 10, 2011 for U.S. Appl. No. 11/624,360, filed Jan. 18, 2007.
"Tips to Negoritate Your Next Software Contract," Corporate EFT Report, vol. 15, No. 24, Dec. 13, 1995.

* cited by examiner

USER ACCESS TO ITEM INFORMATION

CROSS REFERENCE

This application is related to copending U.S. Utility Patent Application entitled "Network Access to Item Information" filed on the same day as the present application and accorded Ser. No. 11/304,338, which is hereby incorporated by reference herein in its entirety.

BACKGROUND

In today's society, consumers, retailers, and manufactures all desire increased information regarding goods and/or services with which they deal. As a nonlimiting example, a consumer who is allergic to certain ingredients that are present in common foods typically desires the knowledge of which foods contain that ingredient. As another nonlimiting example, a patron of a bookstore may be looking for information related to a particular subject. The user may desire a way to determine whether a certain book contains the desired information. Similarly, both retailers and manufacturers may have a desire to receive a broader range of data regarding the products and services in commerce.

Thus, a heretofore unaddressed need exists in the industry to address the aforementioned deficiencies and inadequacies.

SUMMARY

Included in this disclosure are systems and methods for providing product information to a user. More specifically, at least one embodiment described herein is a user device for communicating product information to a user. In this embodiment the user device includes a data storage device, a product identifier input device configured to receive a product identifier, and a plurality of logic. The logic within this user device includes logic configured to retrieve at least one user preference. Other logic available to the user device includes, logic configured to retrieve information regarding a product related to the product identifier from a data network, and logic configured to compare the at least one user preference with at least a portion of the information related to the product.

Another nonlimiting example might include a method of providing product information to a user. At least one embodiment includes receiving a product identifier, the product identifier related to a product, retrieving at least one user preference, and utilizing the product identifier to retrieve information related to the product. In this embodiment the method also includes comparing the at least one user preference with at least a portion of the information related to the product.

Also included herein is a computer readable medium, configured for providing product information to a user. At least one embodiment of the computer readable medium includes logic configured to receive a product identifier, the product identifier related to a product, and logic configured to retrieve at least one user preference. The computer readable medium also includes logic configured to utilize the product identifier to retrieve information related to the product, and logic configured to compare the at least one user preference with at least a portion of the information related to the product.

Other systems, methods, features and/or advantages will be or may become apparent to one with skill in the art upon examination of the following drawings and detailed description. It is intended that all such additional systems, methods, features and/or advantages be included within the scope of the present invention and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
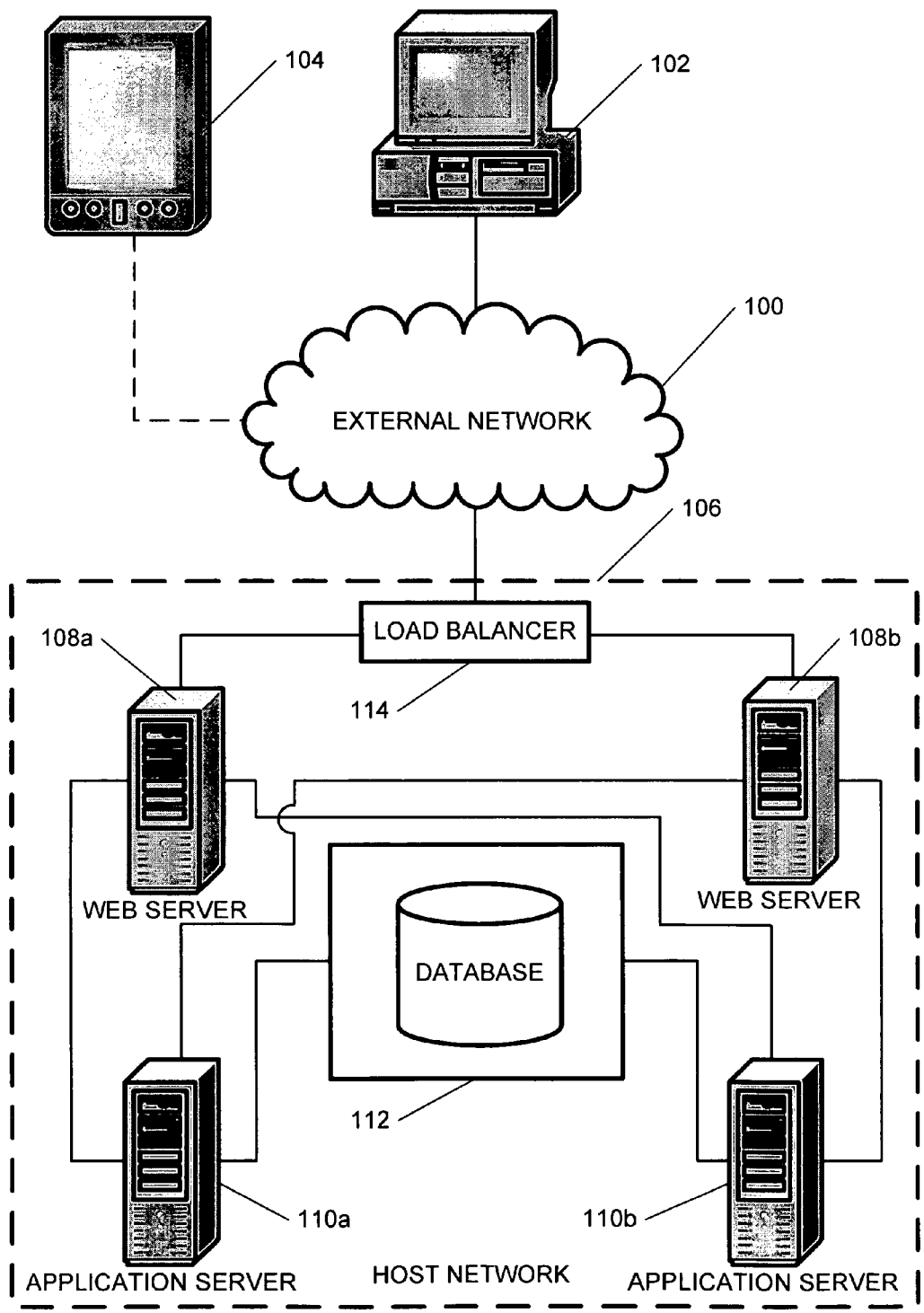
FIG. 1 is a functional diagram representing a structural configuration for providing information to a user.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 1 is a functional diagram representing a structural configuration for providing information to a user. The embodiment of FIG. 1 shows a wired user device 102 and a wireless user device 104 that may be coupled to an external network 100, such as the Internet to communicate with a data network such as host network 106. User devices 102 and 104 may include a personal computer, PDA, BlackBerry®, mobile telephone, an MP3 audio player or other handheld, portable, or other device capable of communicating with an external network 100. While only two user devices 102, 104 are illustrated, any number of user devices may communicate with external network 100.

The host network 106 may include various components including, but not limited to one or more web servers 108a, 108b, one or more application servers 110a, 110b, one or more load balancers 114, and one or more application databases 112.

The load balancer 114 may be implemented in hardware, software, or firmware, and in some embodiments can be used to increase web site efficiency. As more users access a web site, the web host may desire to distribute certain traffic to various portions of the host network 106. In at least one nonlimiting example, the load balancer 114 may be configured to route network traffic between web server 108a and web server 108b. The load balancer 114 may route traffic according to a DNS balancing, hardware load balancing, software load balancing, reverse proxying, or other means of balancing Internet traffic.

In FIG. 1, the web servers 108a, 108b are both coupled to application servers 110a, 110b. Web servers 108a, 108b may serve to communicate HTML (Hypertext Markup Language) code to the user devices 102, 104, and may also serve various other functions, depending on the desires of the host network 106. Historically, web servers 108a, 108b generally utilized HTTP as well as some other protocols to communicate HTML communications to and from the user devices 102, 104. One skilled in the art will be aware of other types of Internet servers using protocols such as, but not limited to telnet, FTP, SMTP, POP3, and IMAP. However, present day web servers 108a, 108b additionally may be capable of running scripts, loading streaming video, and many other functions traditionally reserved for application servers 110a, 110b.

The application servers 108a, 108b from FIG. 1 are both coupled to the web servers 108a, 108b and the application database 112. Application servers 110a, 110b have traditionally enabled a web host to provide streaming video, and other dynamic applications that the web servers 108a, 108b were unable to handle. However, the application servers 110a, 110b may also act as a web server, if the web host desires. In the exemplary embodiment of FIG. 1, both application servers 110a, 110b and web servers 108a, 108b are utilized to facilitate Internet traffic to the web site.

Also included in host network 106 is an application database 112. The application database 112 is coupled to application servers 110a, 110b and may be configured to store data for access by the application servers 110a, 110b. Application database 112 may store other data utilized by the application servers 110a, 110b or data regarding a user of the web site.

In at least one embodiment of the present disclosure, the host network 106 is configured to provide a web site that can include a plurality of data related to a product. It should be appreciated that the term "product", as used in this document, is not limited to goods but may also include services. The user devices 102, 104 are web accessible and can communicate through the Internet to display web site data from a data network such as host network 106. A product identifier may be input into user devices 102, 104 and sent to host network 106. A product identifier may be seen as any indicator of product identity. A product identifier may include a European Article Numbering (EAN) label, an RFID tag, an Electronic Program Code (EPC) label, a UPC label, a product trademark label, or other means for identifying a product or batch of product including but not limited to combinations and function mappings of one or more of the above identifiers. Alternatively, the user devices 102, 104 may include (or be coupled to) a product identifier input device 3099 (not shown here, see FIG. 30) to electronically read a product identifier.

As discussed above, the components illustrated in FIG. 1 are merely illustrative. Any configuration for providing information to a user may also be included in this disclosure.

Figure 2:
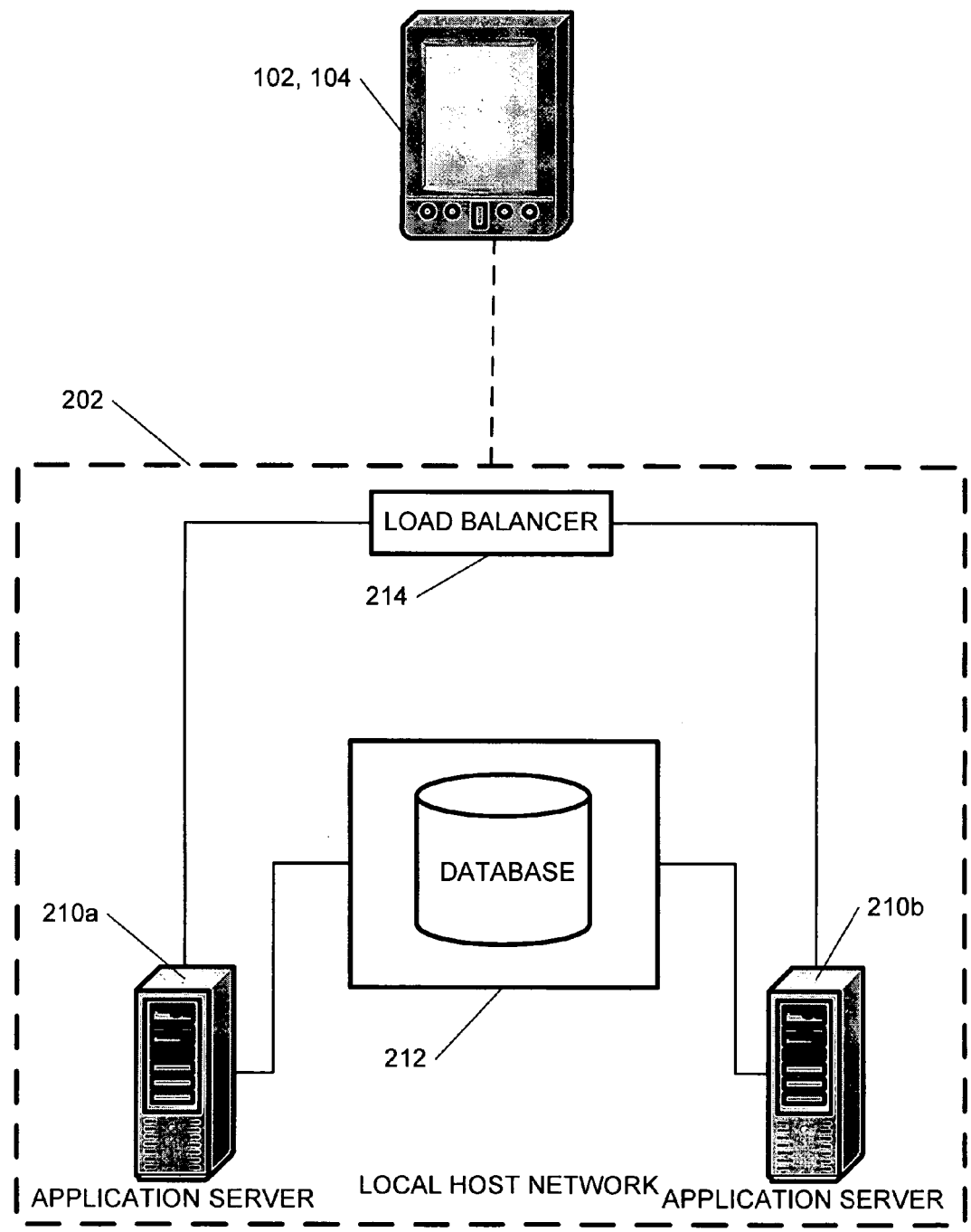
FIG. 2 is a functional diagram representing an alternate structural configuration for providing information from the configuration of FIG. 1.

FIG. 2 is a functional diagram representing an alternate structural configuration for providing information, distinguished from the configuration of FIG. 1. In this nonlimiting example, the user device 102, 104 is coupled to a data network such as local host network 202. The user device may be a portable, wireless device, but this disclosure is not so limited.

User device 102, 104 can be configured to communicate with local host network 202 via any communication means including, but not limited to wired connections and wireless connections such as those enabled by technology such as, but not limited to Bluetooth®, IEEE 802.11 (WiFi), and/or IEEE 802.16 (WiMax). In this nonlimiting example, the user device 102, 104 need not have Internet capabilities. User device 102, 104 can be configured to communicate with local host network 202.

In this nonlimiting example, local host network 202 includes application servers 210*a*, 210*b*, a load balancer 214, and a database 212. These components may operate in a similar manner as those components discussed with respect to the host network 106 in FIG. 1; however, this is not a requirement. Application servers 210*a*, 210*b* may be configured with capabilities to provide information to and receive information from the user device 102, 104 and database 212. Similarly, depending on the desires of local host network 202, a load balancer 214 may be included or omitted. Similarly, the number of application servers utilized with local host network may depend on the desires of the local host network.

While the host network 106 from FIG. 1 communicated with user devices 102, 104 via an external network 100, local host network 202 may be configured to communicate with user device 102, 104 without an external network. Additionally, local host network 202 may be a wireless network of limited range, such being configured to communicate with a user device 102, 104 when the user device is physically located at a certain proximity, such as within a retail establishment.

As a nonlimiting example, the local host network 202 may serve a retail area such as a shopping mall. Alternately the local host network may serve as a single retail store.

Similar to the communication capabilities between the user devices 102, 104 and the host network 106 from FIG. 1, local host network 202 may be configured to communicate product information with user device 102, 104. User device 102, 104 may communicate information including a product identifier via manual user input, or other means such as a product identifier input device 3099 that is included within or coupled to the user device 102, 104 (see FIG. 30).

Figure 3:
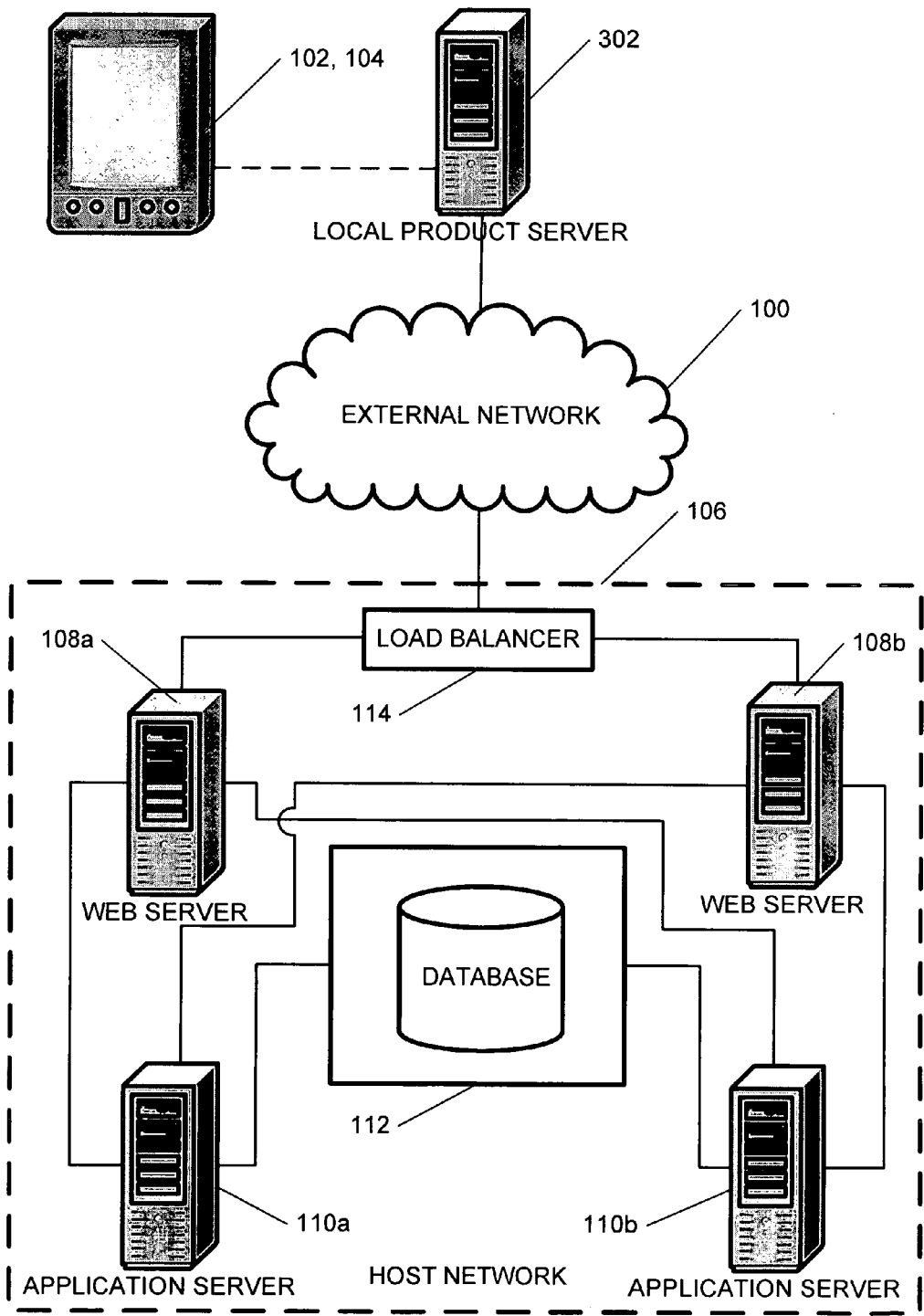
FIG. 3 is a functional diagram representing an alternate structural configuration for providing information from the configurations of FIGS. 1 and 2.

FIG. 3 is a functional diagram representing an alternate structural configuration for providing information from the configurations of FIGS. 1 and 2. In this nonlimiting example, user device 102, 104 communicates with a local product server 302. The local product server 302 is coupled with an external network 100 such as the Internet, and communicates with host network 106 to receive the desired information. As illustrated in FIG. 1, the host network 106 can include web servers 108*a*, 108*b*, application servers 110*a*, 110*b*, application database 112, and load balancer 114. Although the local product server 302 is represented as a single server, local product server 302 may also take the form of local host network 202.

Alternatively (or in conjunction with another embodiment), local product server 302 may be configured to simply provide local data to the user device 102, 104 and a link to the host network 106. As a nonlimiting example, the local product server 302 may serve a retail establishment. When the user device 102, 104 enters within a predefined proximity of the retail establishment, the local product server 302 may simply display a banner indicating that the user device 102, 104 has entered the retail establishment. Additionally, the banner may include a link to a web site where a user can research various products sold by the retailer. In this nonlimiting example, the web site could be a web site hosted by an independent third party and configured to provide users with information regarding a plurality of products, regardless of whether they are affiliated with the retailer.

Figure 4:
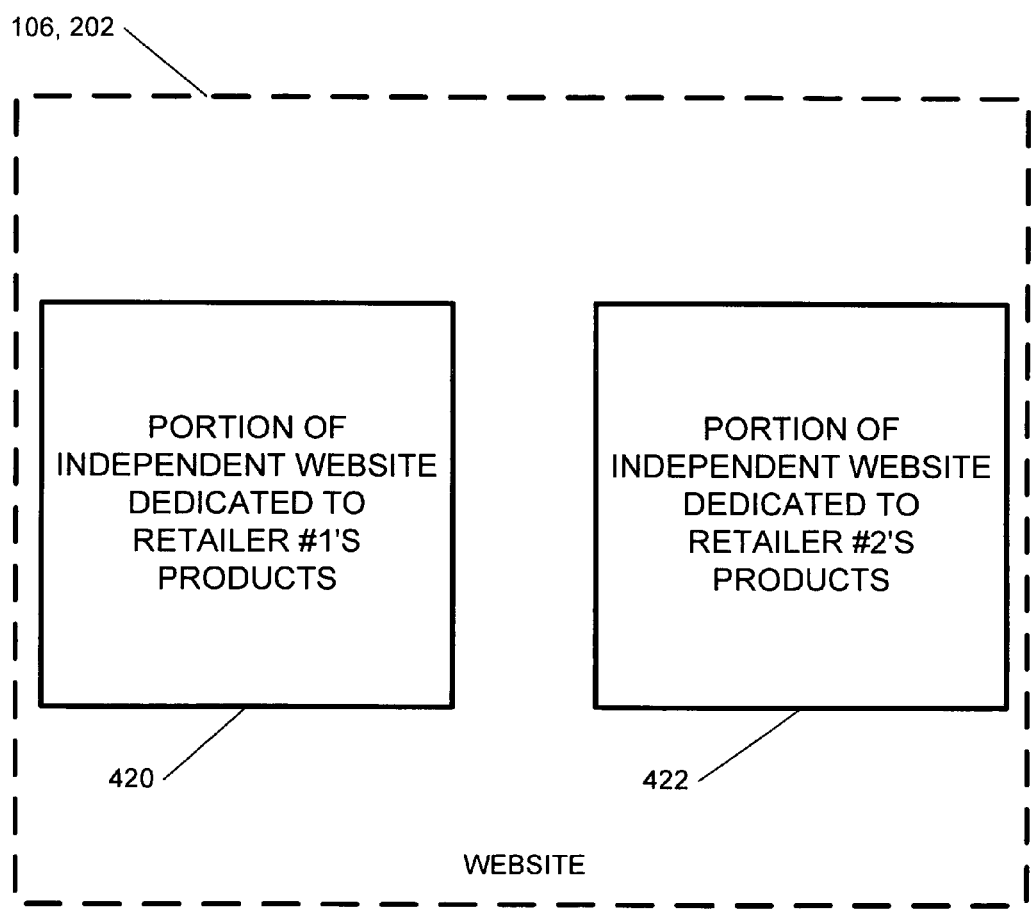
FIG. 4 is an abstraction view representing an implementation for providing product information in conjunction with the structural configurations of FIGS. 1, 2, and 3.

FIG. 4 is an abstract view representing an implementation for providing product information in conjunction with the structural configurations of FIGS. 1, 2, and 3. In this nonlimiting example, the host network 106, 202 may be configured to provide product information related to those products sold by the desired retailer. As a nonlimiting example, the user device 102, 104 may enter into retailer #1's store. As in FIG. 3, the local product server 302 can provide a banner to user device 102, 104. However, in this nonlimiting example, the local product server 302 may provide a link to a portion of the information provided by host network 106, as illustrated in block 420. A user device gaining access to the host network 106 via retailer #1's local product server, may be denied access to information related to products sold by retailer #2, as illustrated in block 422. The host network 106 may limit access to prevent shoppers of retailer #1 from accessing information to products that compete with the products sold by retailer #1. Additionally, if a user is currently shopping in retailer #1's store, the user may want the ease of searching a smaller amount of data to find the desired product.

Also, in another nonlimiting embodiment, retailer #1 may allow access to the information about retailer #2's products and/or services. However, a fee (such as a commission or referral fee) or other form of cross compensation could be charged or exchanged for providing the customer with information about retailer #2's goods and/or services.

Similarly, combining the configuration from FIG. 1 with the configuration from FIG. 4, a user may access retailer #1's web site, which may provide a link to host network 106. Host network 106 may be configured to recognize that the user device 102, 104 accessed the web site via retailer #1's web site, and therefore limit access to only to those products sold by retailer #1. Access to other products may be denied.

As an alternative nonlimiting example, local host 202 from FIG. 2 may also be configured for such an implementation. If local host network 202 is configured to serve a plurality or retail stores with a certain proximity, a user's access to certain portions of the data may depend on the user's location. Similarly, local host 202 may serve a retail store that wishes to segregate user access One should note that for each of the embodiments described above, host network 106 may be managed (or managed for) a manufacturer, retailer, or independent third party. Depending on the desired configuration, any of these entities may utilize such a configuration.

Figure 5:
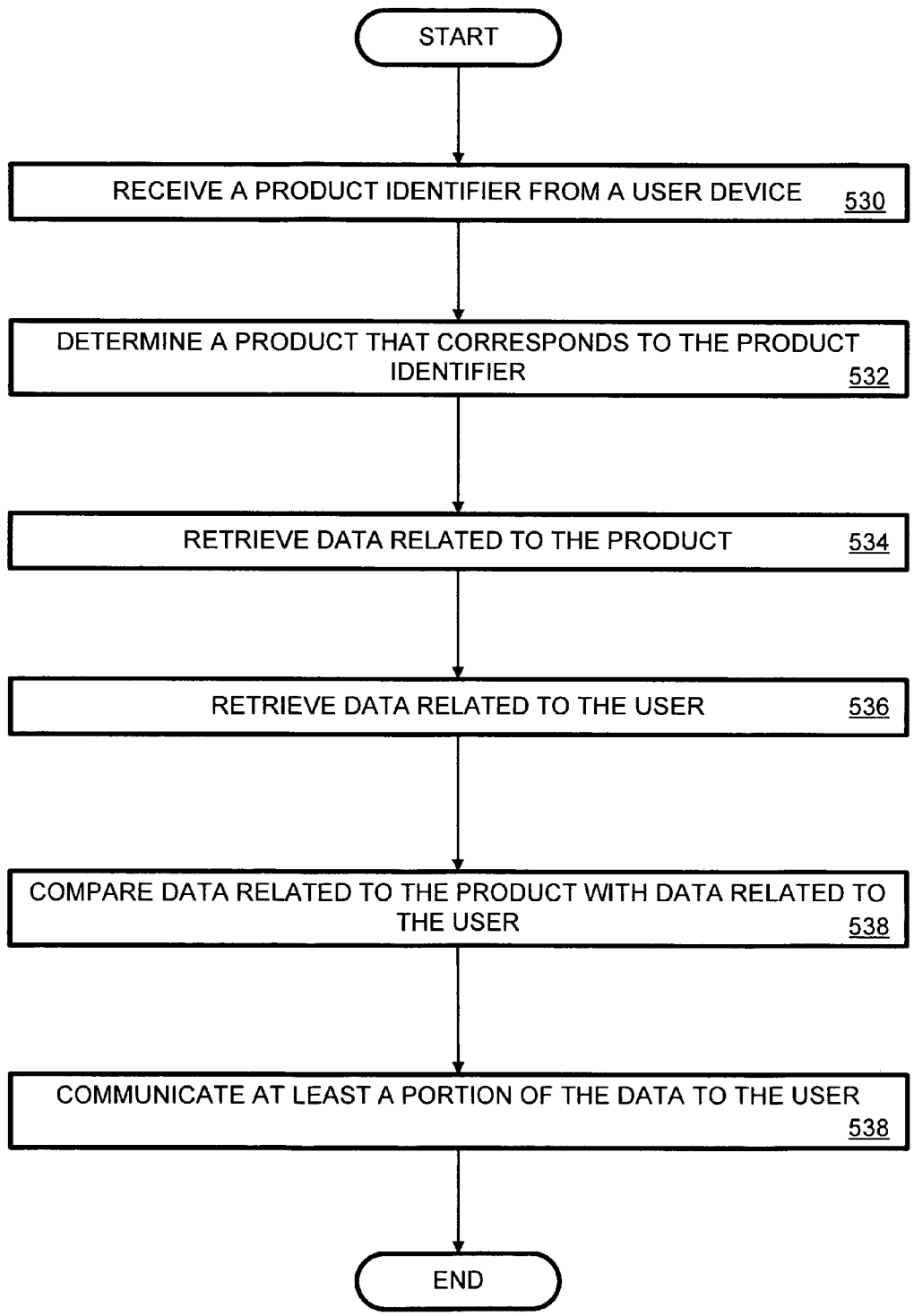
FIG. 5 is a flowchart illustrating steps that may be taken to provide product information to a user pursuant to a configuration such as the configurations from FIGS. 1, 2, 3, and 4.

FIG. 5 is a flowchart illustrating steps that may be taken to provide product information to a user pursuant to a configuration such as the configurations from FIGS. 1, 2, 3, and 4. As illustrated the first step of this nonlimiting example is to receive product information from a user device (block 530). A network may receive this information via an Internet connection, a wired direct connection, a wireless direct connection, or other similar connection, some of which are described herein. The information can include a product identifier such as information related to a bar code scan, or an RFID scan. Alternatively, the information can be a data string entered by a user through a keypad, touch screen, stylus, mouse, or speech input; data captured by an image scanner or camera with or without associated pattern recognition & such as the logo or trademark of the product) or optical character recognition (OCR); or other product information input means. Once the product information is received, a determination can be made regarding the product that corresponds to the information (block 532). Depending on the type of product identifier, information related to the product can take any of a plurality definitions. As a nonlimiting example, if the product information takes the form of a bar code scan, the product information may relate to the type of product without production batch, production date, and/or factory source information. Alternatively, if an RFID product identifier is used, the product information may relate to information about the production batch, the production date, and/or the factory source, as well as to information on the general product type (Coke® versus Diet Coke®) and/or the size or quantity of the product (20 ounce versus 2 liter).

The next step in this nonlimiting embodiment is to retrieve data related to the product (block 534). This data may also be stored in a data storage unit, such as a database or logic configured to store data, and can link the product identifier to the product information. The data related to the product can include any of a variety of types of data including ingredients, components, preparation directions, assembly directions, nutritional facts, other similar products, manufacturer data, sales data, etc.

The next step in this nonlimiting example is to retrieve information related to the user (block 536). While this step is listed as the third step in this flowchart, the present disclosure intends that this step (as well as other steps) are merely illustrative and need not occur in any particular order. Retrieving the user information may include receiving a USERID and password, or other authentication process to identify the user such as but not limited to biometric data that could include information such as, but not limited to, finger prints, voice spectral characteristics, facial structure, retinal scan, blood vessel/vein patterns, etc. (and permutations thereof). The authentication process can also include accessing a data storage unit, such as a database or logic configured to store data to retrieve data related to the authenticated user. This information can relate to user preferences such as allergies, previous purchases, spending habits, likes, dislikes, and other information depending on the particular embodiment.

In some nonlimiting embodiments, the user preference settings can be user-specific and directly programmed by the user. Also, the settings might be downloaded from a network site such as a web site. For instance a PETA® (People for the ethical Treatment of Animals) web site may maintain a whitelist of foods containing no animal byproducts and/or maintain a blacklist of foods containing animal byproducts. Similarly, collective interest web sites could be maintained by food-related groups such as the Atkins Diet, Weight Watcher's®, and/or Kosher food lists as well as maintained by non-food related groups that wish to economically boycott or support various goods and/or services of companies for any political reason.

Once the data related to the user and the data related to the product have been acquired, an analysis of these data can be made. In a nonlimiting embodiment the analysis includes a comparison. However, other embodiments may include additional or other analysis methods. As stated above, the user data can include ingredients, manufacturers, or other data that they do or do not want associated with products they buy. This data can be compared with data relating to the product to determine if the product is a product that the user specifically designated as desirable or undesirable.

Once a comparison of user preferences and the product data has been completed, information related to whether the product is desirable or undesirable can be communicated to the user (block 538). This communication can be sent via the same type of communication that the user device initiated in block 530, however this is not required. This information can also be communicated using other communication means that may be electromagnetic (including wired and/or wireless) as well as non-electromagnetic such as e-mail, telephone, instant messaging, postal mail, etc.

Figure 6:
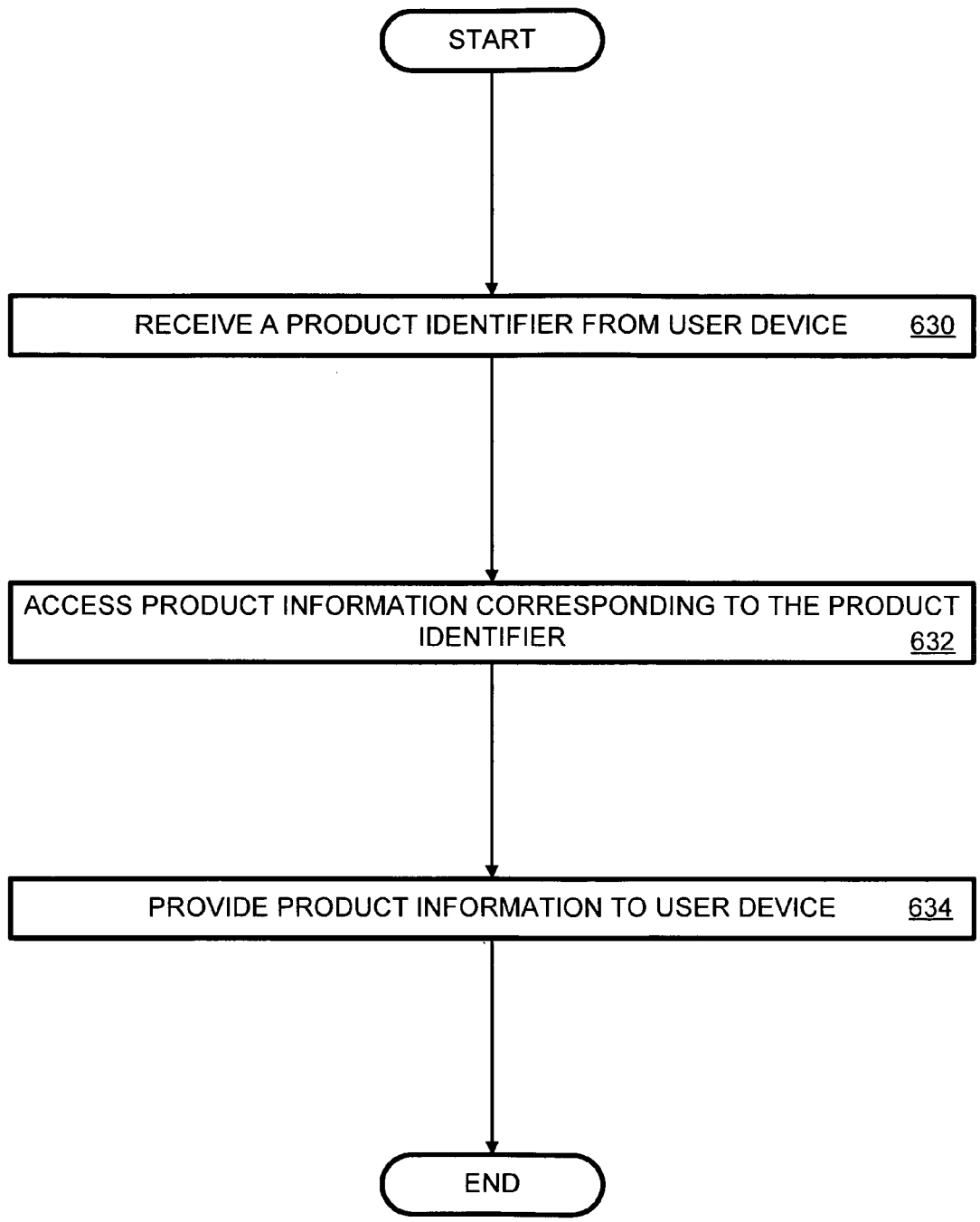
FIG. 6 is a flowchart illustrating steps that may be taken to provide information to a user device pursuant to the configuration of FIG. 1.

FIG. 6 is a flowchart illustrating steps that may be taken to provide information to a user device 102, 104 pursuant to the configuration of FIG. 1. This nonlimiting example begins with the host network 106 receiving a product identifier from a user device 102, 104. In at least one embodiment, the product identifier is UPC or RFID data. The user device 102, 104 may receive this information via a product identifier input device 3099 (FIG. 30), to receive the product identifier.

Once the user device 102, 104 obtains the product identifier, the user device 102, 104 can communicate this data to the host network 106. The host network can then receive the product identifier from the user (block 630). The host network 106 can access information related to the product that corresponds to the product identifier (block 632). The host network 106 can access this data via application database 112, or other similar structure for storing information. The host network 106 can then provide the desired information to the user device 102, 104 (block 634).

Figure 7:
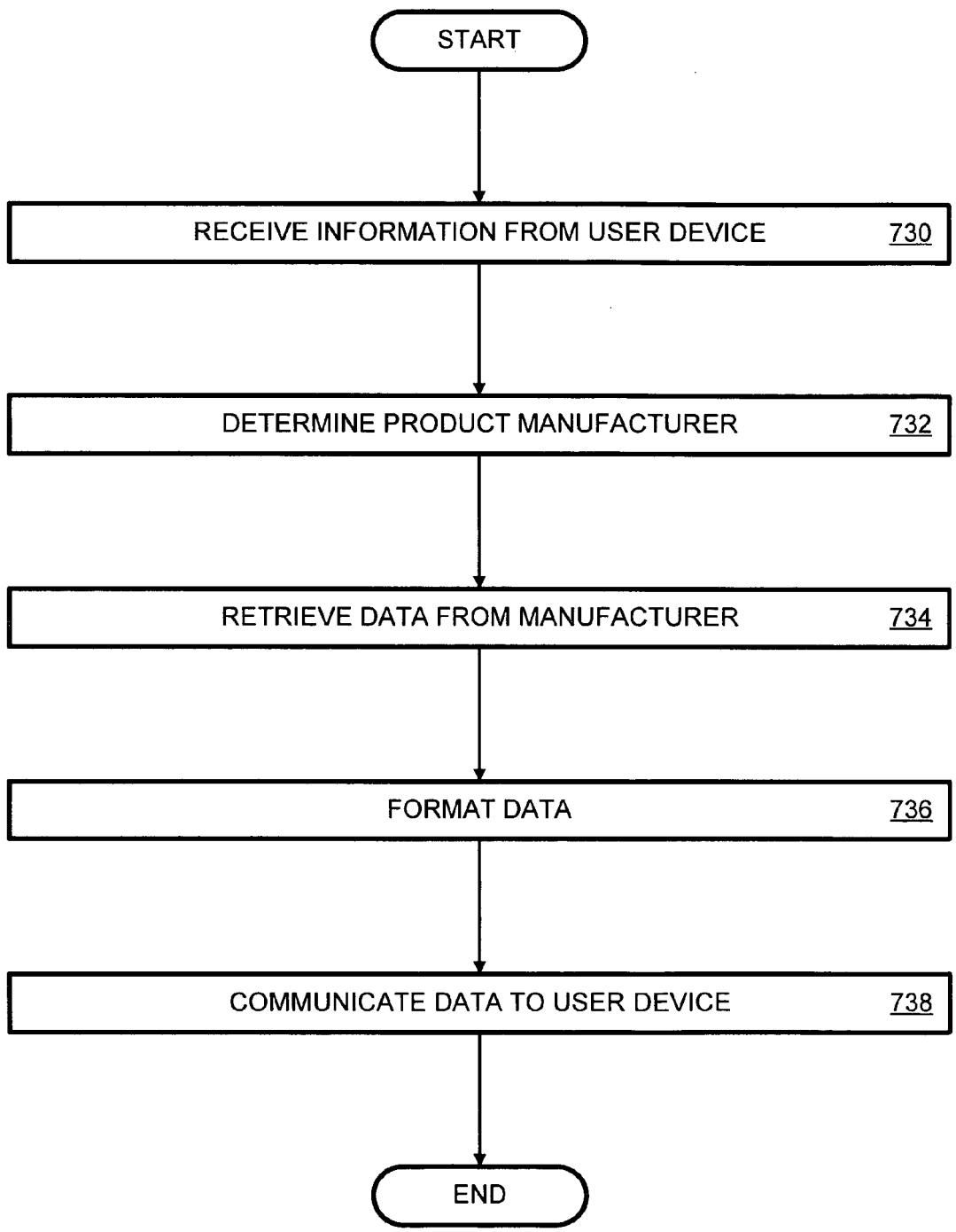
FIG. 7 is a flowchart illustrating steps that may be taken to provide information to a user device pursuant to the configuration of FIG. 2.

FIG. 7 is a flowchart illustrating steps that may be taken to provide information to a user device pursuant to the configuration of FIG. 2. As illustrated in the nonlimiting example of FIG. 7, the local host network 202 may receive information from a user device 102, 104 (block 730). In a nonlimiting embodiment, the information may take the form of a UPC and/or RFID product identifier. Once the information is received from the user device 102, 104, the local host network 202 can then determine the product manufacturer (block 732). The product manufacturer data may be located in database 212 or other storage device accessible by local host network 202. Once the manufacturer of the product is determined, the local host network 202 may then retrieve the data from the manufacturer (block 734). In at least one embodiment, the local host network 202 has Internet access to access the manufacturer's web site, however this is not a necessity. Alternatively, in at least one embodiment the local host network 202 may store all product and manufacturer information locally. Responsive to user input, the local host network 202 may then access the data.

Once the data is retrieved, the local host network 202 may then desire to format the data for a desired presentation to user device 102, 104 (block 736). The local host network 202 may receive the data that is unreadable to user device 102, 104, or the information may include other data, such as advertisements that local host network 202 does not want conveyed to the user device 102, 104. As one of ordinary skill in the art will understand, various markup languages such as, but not limited to HTML and/or XML can be used for inserting, dropping, and/or merging various information streams. Also MPEG allows the insertion, drop, and/or merge of information streams utilizing audio/voice, video/image, data, code, and/or permutations thereof. Once the data is formatted to suit the desires of local host network 202, the local host network 202 may communicate the formatted data to the user device (block 738).

Figure 8:
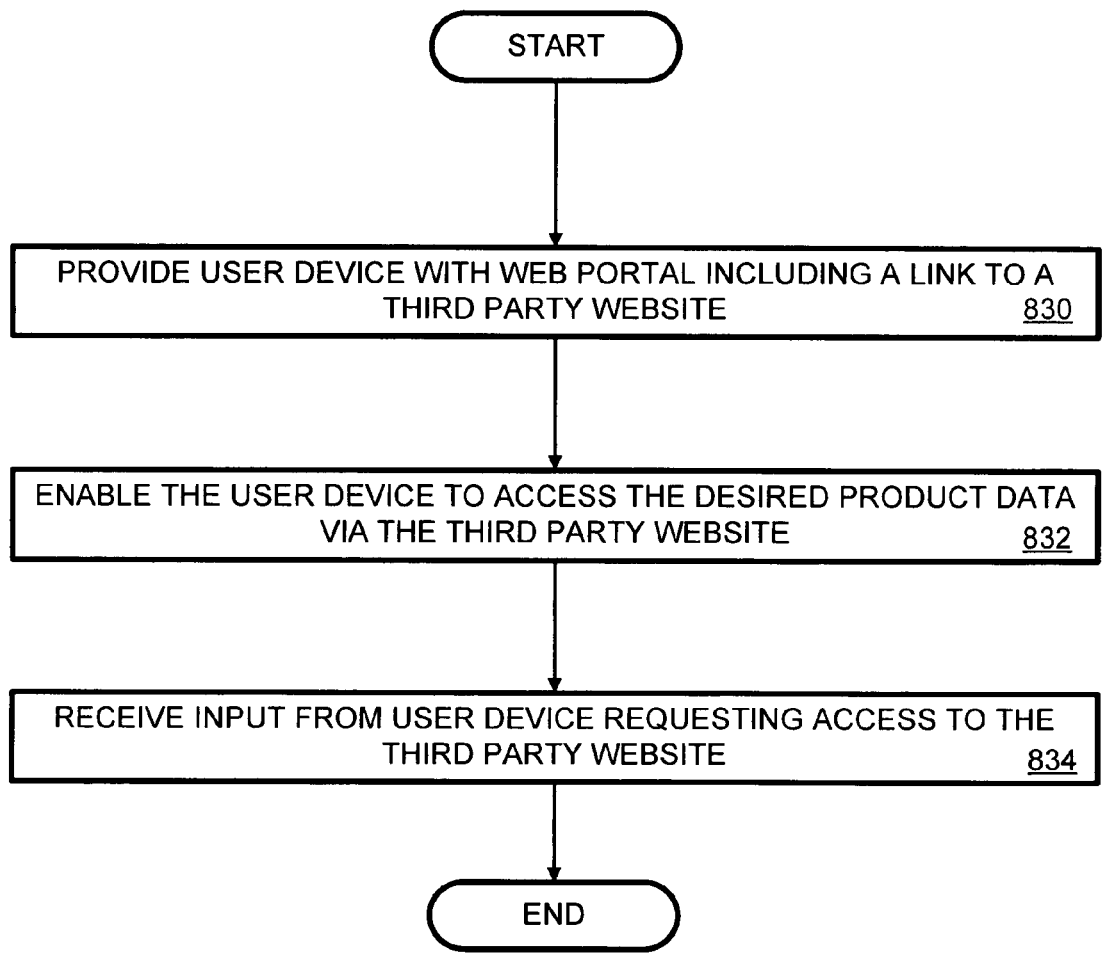
FIG. 8 is a flowchart illustrating steps that may be taken to provide information to a user device pursuant to the configuration of FIG. 3.

FIG. 8 is a flowchart illustrating steps that may be taken to provide information to a user device 102, 104 pursuant to the configuration of FIG. 3. In this nonlimiting example, the local product server 302 may provide the user device 102, 104 with a web portal that includes a link to an independent third party web site (block 830). Once the user device 102, 104 selects the option of viewing the third party's web site, local product server 302 may then enable the user device to access the desired product information via the independent third party web site (block 832). This step may include simply providing a link to an independent third party web site. When the user selects the link, the local product server 302 enables the user device 102, 104 to display the web page of the independent third party web site (block 834).

As an alternate embodiment, discussed above, the local product server 302 may instead provide a display to the user device 102, 104 that includes links to various products sold by that retailer. By selecting a link, the user could be taken directly to a web page controlled by the product manufacturer. Each link could lead to a different manufacturer, depending on the products sold by the retailer. Alternatively, the links could lead to different pages of the same web site, depending on the desired configuration.

Figure 9:
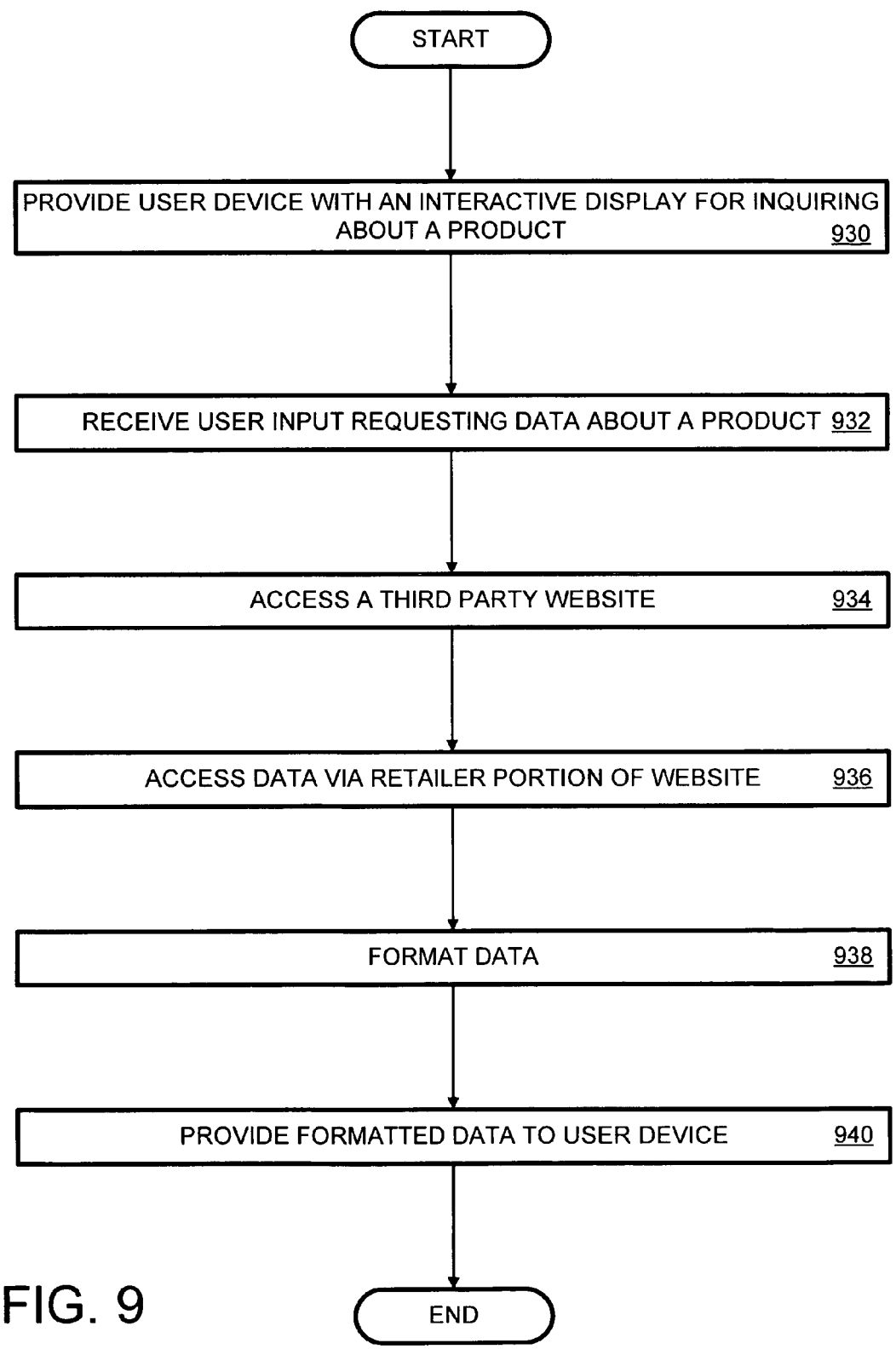
FIG. 9 is a flowchart illustrating steps that may be taken to provide information to a user device pursuant to the configuration of FIG. 4.

FIG. 9 is a flowchart illustrating steps that may be taken to provide information to a user device 102, 104 pursuant to the configuration of FIG. 4. In this nonlimiting example, the local host network 202 or local product server 302 provides the user device 102, 104 with an interactive portal for inquiring about a product (block 930). The interactive portal may include a display that a user can perceive. The user may also be able to input data regarding the information the user received in the display. The local host network 202 or local product server 302 can then receive user input requesting data about a product (block 932). This user input may include UPC or RFID data. Alternatively, the data received from the user may be related to an information request in the opposite direction. More specifically, the user may submit data such as a product name to receive the UPC or RFID data. User input of product data can be through various interfaces such as but not limited to keypad, stylus, touch screen, mouse/pointer, voice/audio with speech/audio recognition such as recognition of the user's spoken name of a product or recognition of a product's audio trademark, and/or image or pattern recognition such as recognition of visual trademark, service mark, logo, differentiating color, container shape (such as an hour glass soda bottle for Coca-Cola®) or other item identifying characteristic.

Once the data is received, the local host network 202, or local product server 302 may access a third party web site (block 934). The third party web site may grant access to the local host network 202 or local product server 302 through receipt of a USERID and password, digital certificate, or other security and/or authentication measures known in the art. Once the local host network 202, or local product server 302 accesses the third party web site, third party web site may grant access to the data relating to the products that that retailer sells. For various reasons, some of which are described above, the retailer or the web host may desire to grant users access to a portion of the data on the web site, while filtering and/or blocking access to other data on the web site. For this reason the local product server can access the requested data via that retailer's portion of the third party web site (block 936).

Once the data is accessed, the local host network 202 or local product server 302 can format the data to a desired format (block 938). The local host network 202 or local product server 302 can then provide the formatted data to the user device 104 (block 940).

Figure 10:
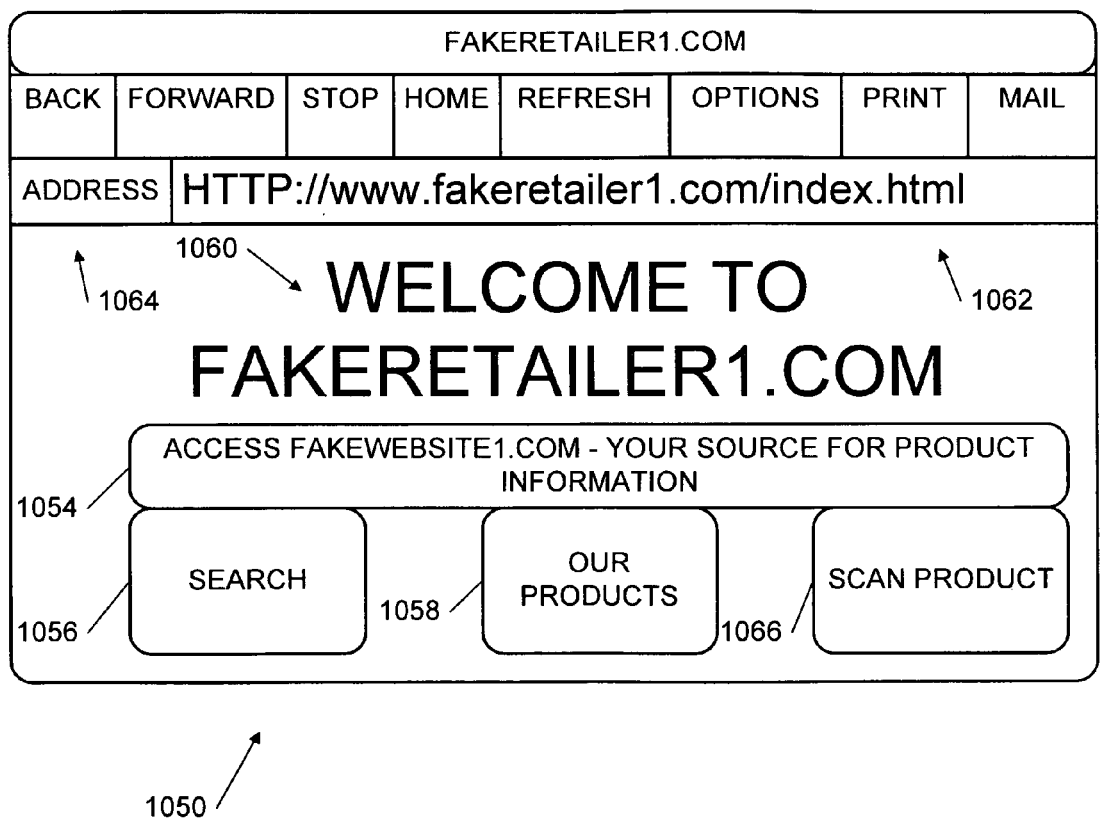
FIG. 10 is an exemplary screen shot of a retailer welcome display that may be presented to a user device pursuant to the configuration of FIGS. 2, 3, and 4.
Figure 12:
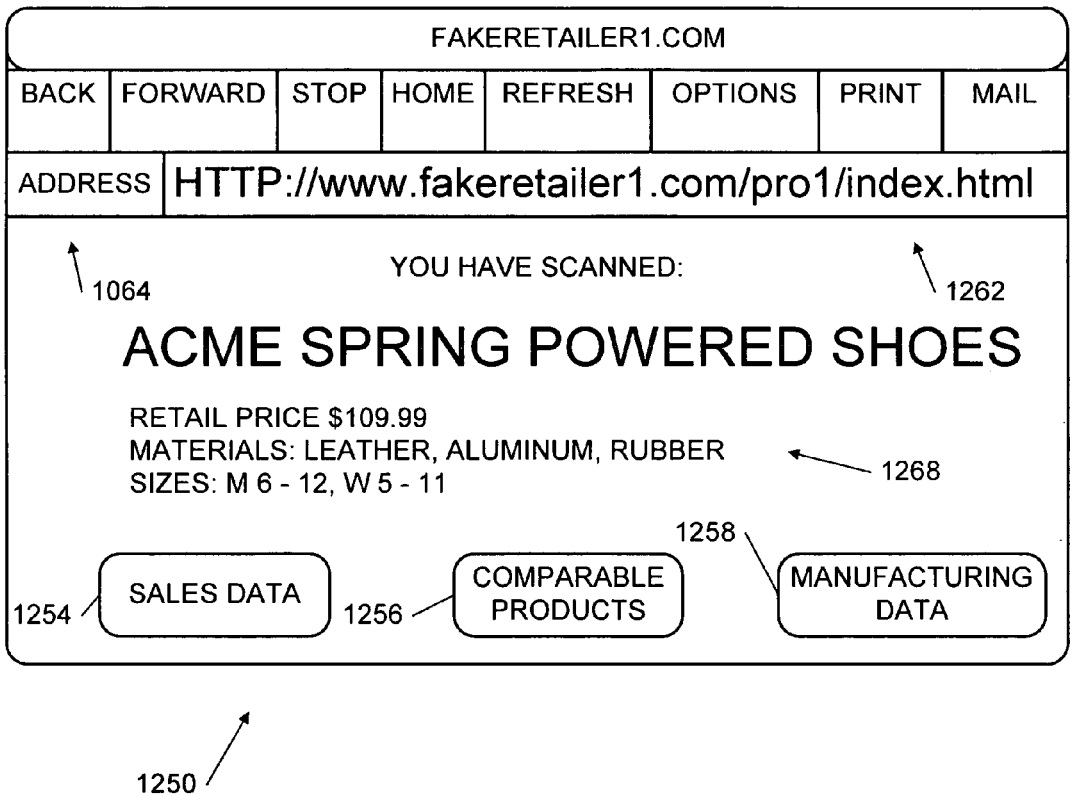
FIG. 12 is an exemplary screen shot of a retailer product information display that may be presented to a user device pursuant to the configuration of FIGS. 2, 3, and 4.

FIG. 10 is an exemplary screen shot of a retailer welcome display that may be presented to a user device pursuant to the configuration of FIGS. 2, 3, and 4. As illustrated in FIG. 10, screenshot 1050 may include a homepage for a retailer web site. In this nonlimiting example, an address bar 1064 includes a unique URL address 1062 for the fakeretailer1.com homepage. The homepage 1050 also includes a welcome banner 1060, and a plurality of links to other areas of the web site. In this nonlimiting example a fakewebsite1.com link 1054 may be accessed to direct a user to the fakewebsite1.com web site (FIG. 12). Also included is a search link 1056, an "our products" link 1058, and a "scan product" link 1066. The search link 1056 may be activated to take the user to a search page. The search page (not shown) may provide the user the ability to search for a product by product name, manufacturer, last purchase by the user, product identifier number, or other criteria.

Figure 11:
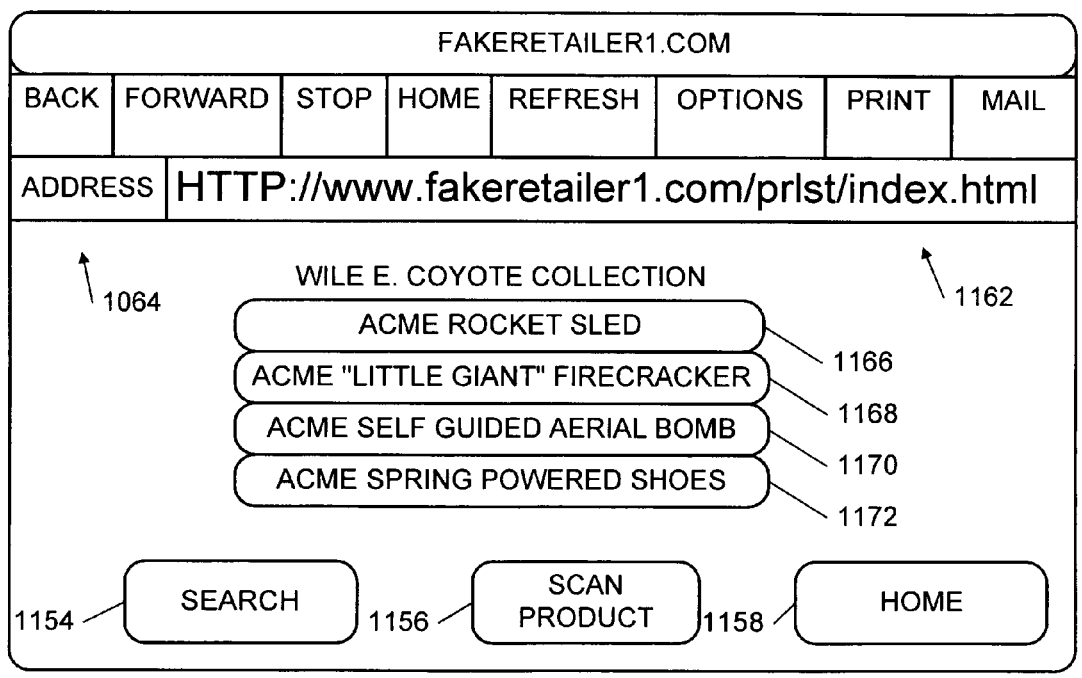
FIG. 11 is an exemplary screen shot of a retailer product display that may be presented to a user device pursuant to the configuration of FIGS. 2, 3, and 4.

Also included is an "our products" link 1058, which may provide a list of the products sold by the retailer (see FIG. 11). Additionally, a "scan product" link 1066 is also included in this screenshot. The scan product link 1066 may provide the user the ability to simply scan a product's UPC or RFID (or other form of product identifier). One should note that the web site might be configured to simply scan a product from any point without the user accessing the "scan product" link 1066. Additionally, in at least one nonlimiting example, the web site and user device 102, 104 may be configured such that the user device can store product identifier information for uploading to the web site at a later time. This configuration allows great flexibility for the user.

In addition to a data-pull paradigm of a user requesting information on a product, a data-push paradigm could be used as well with a user subscribing to a retailer's RSS (Really Simple Syndication) service. One of ordinary skill in the art will be aware of various RSS protocols with some similar features that provide syndication functionality. Some nonlimiting syndication protocols are RSS, Rich Site Summary and Resource Description Framework (RDF) Site Summary. The syndication feeds for a customer may be activated based on various events such as, but not limited to a customer's device coming within proximity of the retailer's or service company's brick and mortar physical store or a customer indicating a selection of an item by scanning the item's UPC label, RFID, or placing the item in a shopping cart.

FIG. 11 is an exemplary screen shot of a retailer product display that may be presented to a user device pursuant to the configuration of FIGS. 2, 3, and 4. As illustrated in FIG. 1, the address bar 1064 includes a unique URL 1162. In at least one embodiment, this web page may be accessed via the "our products" link 1058 from FIG. 10. The "our products" web page 1050 can include a list of products sold by the retailer. These products may be organized according to a plurality of criteria, and may be too numerous to properly display on a single web page. In such a situation, the web site may provide links to products based on organizational criteria such as manufacturer, product type, etc.

In the nonlimiting example of FIG. 11, products from the Wile E. Coyote Collection are displayed as links 1166, 1068, 1170, and 1172. These links can lead the user to another web page that includes more detailed information regarding the product selected. Also included is a search link 1154, a scan product link 1156, and a home link 1158.

FIG. 12 is an exemplary screen shot of a retailer product information display that may be presented to a user device pursuant to the configuration of FIGS. 2, 3, and 4. As illustrated in FIG. 12 web page 1250 includes address bar 1064 and a URL 1262. While the screenshot of FIG. 12 states that the ACME spring powered shows product identifier that has been scanned, as described above, this page may be accessed through the selection of this product link 1174 from FIG. 11, by entering the URL in the address bar 1064, or by other common ways of accessing such a display.

As shown in FIG. 12, various details related to the scanned product are displayed. This information may be specific to the retailer, or may be general information regarding the product. Additionally, web page 1250 also includes links to other information including sales data 1254, comparable products 1256, and manufacturing data 1258. While these links may be configured for a user to acquire more information regarding a product, this information may also be useful to the retailer or manufacturer. As such, the web site may be configured to grant access to various information depending on user identification.

One should note that while the screenshot embodiments regarding FIGS. 10, 11, and 12 describe the implementation in a web site format, this is not intended to be a limitation of the present disclosure. In at least one embodiment, the information described herein may be conveyed to a user device without use of an external network such as the Internet. As such, references to Internet based applications are nonlimiting examples.

Figure 13:
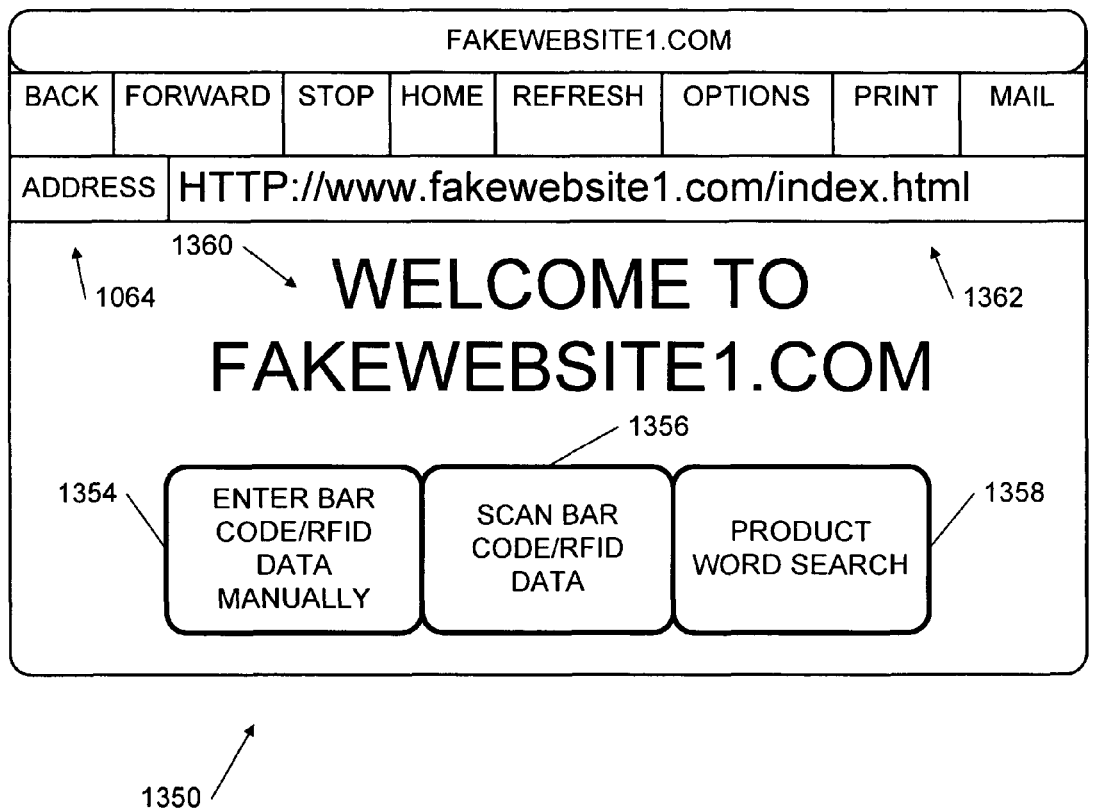
FIG. 13 is an exemplary screen shot of a product information welcome display that may be presented to a user device pursuant to the configurations of FIGS. 1, 3, and 4.

FIG. 13 is an exemplary screen shot of a product information welcome display that may be presented to a user device pursuant to the configurations of FIGS. 1, 3, and 4. As illustrated in FIG. 13, web page 1350 includes an address bar 1064, which includes a URL 1362 corresponding to the Fakewebsite1.com web site. Also included in web page 1350 is a welcome banner 1360, and a plurality of links to other web pages. The links include an "enter bar code/RFID data manually" link 1354, a "scan bar code/RFID data" link 1356, and a "product word search" link 1358.

In addition, although all these interfaces are not shown in FIG. 13, a user can enter information on goods and/or services into the device using various input techniques such as, but not limited to keypad/keyboard, stylus, mouse, cursor keys, spoken language, or other audio recognition, still or moving video images, and permutations thereof. As nonlimiting examples, the device could search for a product word using optical character recognition of text on a product's label, or the search may be based on speech recognition of the text of the user's input. In addition, in other nonlimiting embodiments, the device could search by performing pattern recognition on trademarks, service marks, trade dress, or other source signal identifiers including, but not limited to, visual effects such as still logos, moving pictures, particular colors, bottle shape, audio sequences, or any other product or service characteristics that are used as source signals. Thus, the device might recognize the script Coca-Cola® on a bottle, the hour glass shape of a bottle, or the red color of a bottle or can. As one of ordinary skill in the art will understand, pattern recognition functionality can be performed by various statistical and/or artificial intelligence methods such as, but not limited Bayesian inference analysis Fuzzy logic and/or neural network hardware and/or software algorithms.

Figure 14:
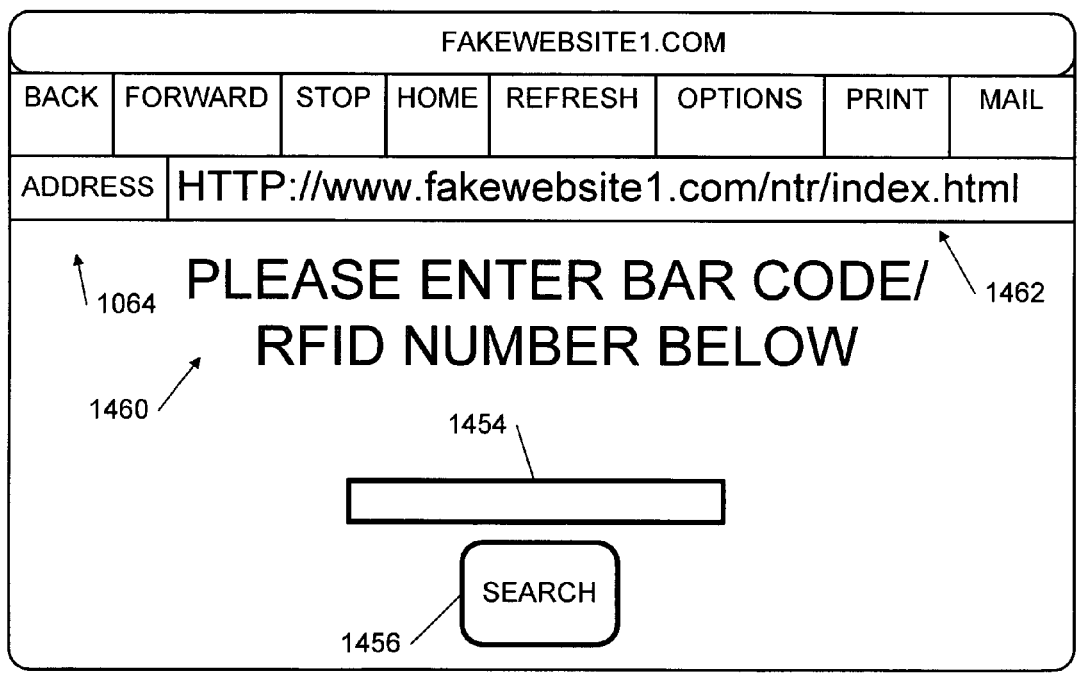
FIG. 14 is an exemplary screen shot of a product identifier input display that may be presented to a user for inputting a product identifier pursuant to the configurations of FIGS. 1, 2, 3, and 4.

FIG. 14 is an exemplary screen shot of a product identifier input display that may be presented to a user for inputting a product identifier pursuant to the configurations of FIGS. 1, 2, 3, and 4. As illustrated in FIG. 14, address bar 1064 includes a URL 1462 corresponding to web page 1450. Additionally included in web page 1450 is banner 1460, a prompt window 1454, and a search link 1456. In the event that the user does not have access to a bar code scanner, or other automatic means for inputting a product identifier, the user can manually enter a product's product identifier number into the prompt window 1454.

Figure 15:
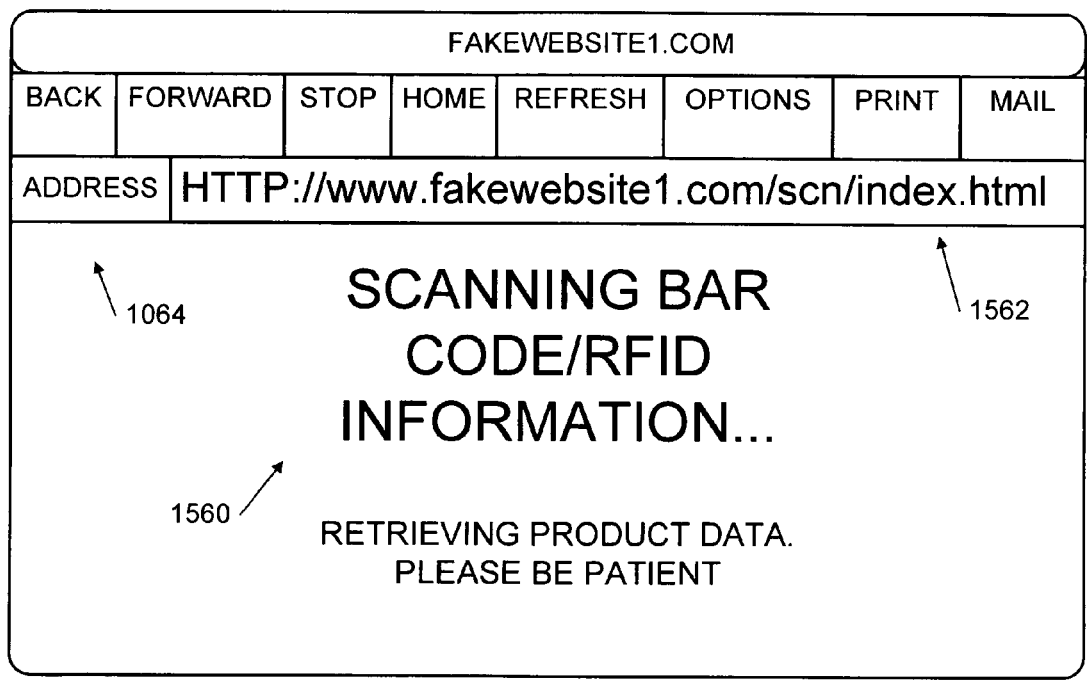
FIG. 15 is an exemplary screen shot of a product identifier scanning display that may be presented to a user for inputting a product identifier via a scanning process, pursuant to the configurations of FIGS. 1, 2, 3, and 4.

FIG. 15 is an exemplary screen shot of a product identifier scanning display that may be presented to a user for inputting a product identifier via a scanning process, pursuant to the configurations of FIGS. 1, 2, 3, and 4. As illustrated in FIG. 15, address bar 1064 includes a URL 1562 identifying web page 1550. Also included in web page 1550 is a banner 1560 indicating that scanning is in progress. The scanning process may be implemented through a UPC or RFID scanning device or other means for collecting a product identifier. One should note that while a UPC scanning device may desire the product bar code scanner be directed to the bar code, an RFID tag broadcasts a radio frequency signal that can be received by an RFID scanner that is in the proximity of the RFID tag. Regardless of the means for receiving the product identifier, this information can be received by the user device 102, 104.

Figure 16:
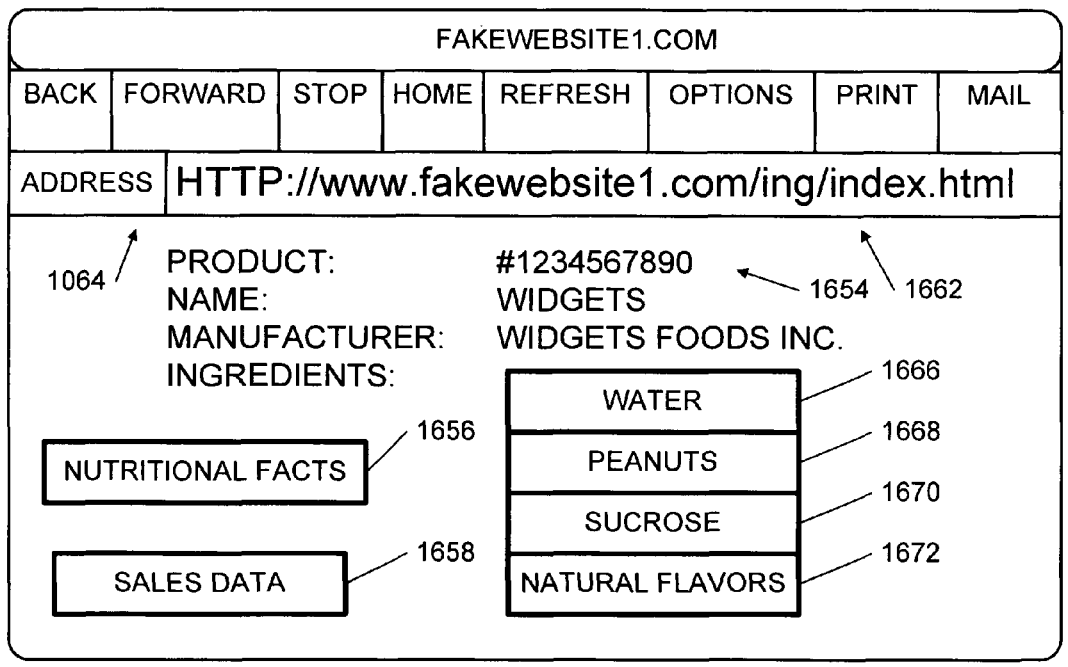
FIG. 16 is an exemplary screen shot of a product identifier scanning display that may be presented to a user for inputting a product identifier via a scanning process, pursuant to the configurations of FIGS. 1, 2, 3, and 4.

FIG. 16 is an exemplary screen shot of a product identifier scanning display that may be presented to a user for inputting a product identifier via a scanning process, pursuant to the configurations of FIGS. 1, 2, 3, and 4. Similar to web page 1250 from FIG. 12, web page 1650 includes an address bar 1062 with a unique URL 1662. Web page 1650 also includes a product number, a product name, and a manufacturer and ingredients, as shown with element 1654. The user may also have access to supplemental information regarding the ingredients, as shown with links 1666, 1668, 1670, and 1672. The user can access nutritional facts via link 1556, or sales data via link 1658. Sales data might include, but is not limited to, price, volume, and/or expiration date.

Figure 17:
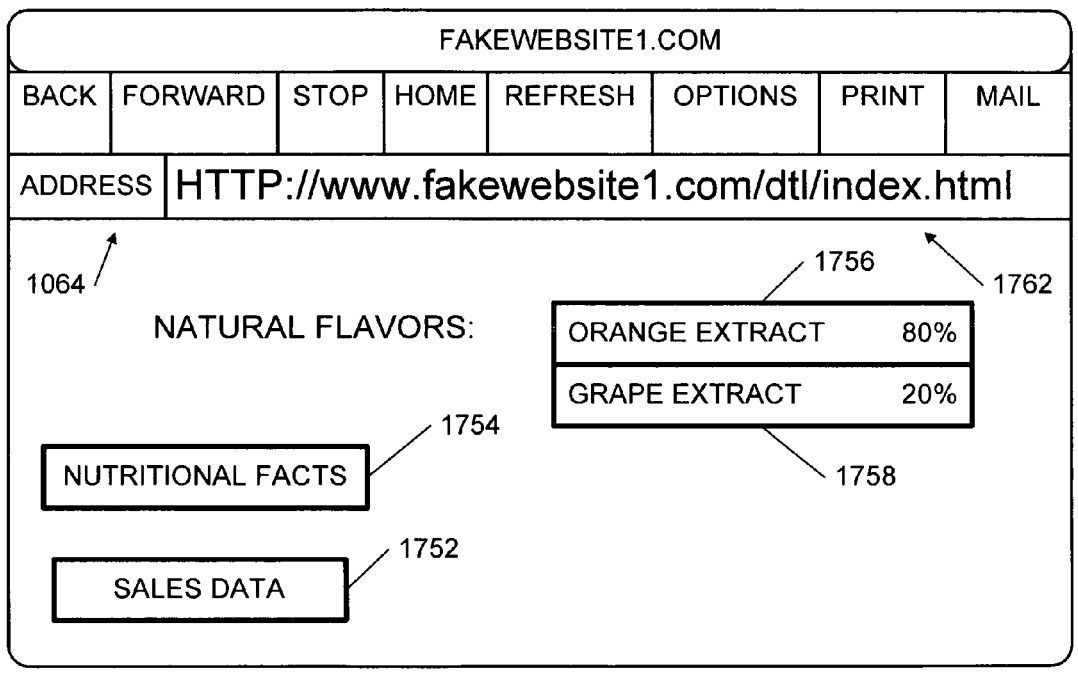
FIG. 17 is an exemplary screen shot of an ingredient information display that may be presented to a user for viewing specifics of an ingredient, responsive to selecting the natural flavors link from FIG. 16.

FIG. 17 is an exemplary screen shot of an ingredient information display that may be presented to a user for viewing specifics of an ingredient, responsive to selecting the natural flavors link 1672 from FIG. 16. FIG. 17 illustrates web page 1750, which includes address bar 1064 and unique URL 1762. Included in web page 1750 are links to various data relating to the natural ingredients designation of the ingredients from FIG. 16. This data includes orange extract link 1756, and grape extract link 1758. These links 1756, 1758 may provide access to supplemental information regarding the selected ingredient. Such information can include definitions, and other information potentially helpful to a user. As a nonlimiting example, the definitions might contain mappings from complex chemical names such as sodium chloride and sucrose on a label to more common names such as table salt and sugar, respectively. Also listed is a percentage composition of these ingredients. One should note that although a percentage composition is illustrated in FIG. 17, this is but a nonlimiting example. Any additional information may be substituted for, or added to the information displayed in FIG. 17.

Figure 18:
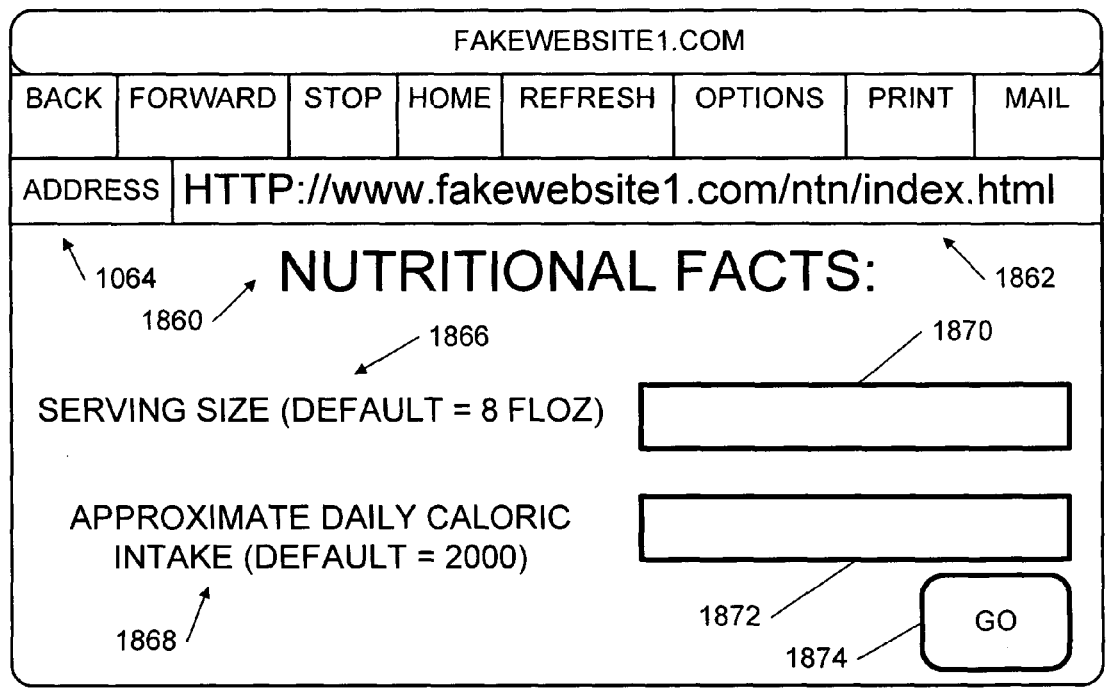
FIG. 18 is an exemplary screen shot of a serving size input display that may be presented to a user for entering a desired serving size and daily caloric intake responsive to selecting the nutritional facts option from FIG. 17.

FIG. 18 is an exemplary screen shot of a serving size input display that may be presented to a user for entering a desired serving size and daily caloric intake responsive to selecting the nutritional facts option from FIG. 17. Additionally, web page 1850 can be accessed via link 1656 from FIG. 16. Web page 1850 includes an address bar 1064 with a unique URL 1862, and a banner 1860. Also included in web page 1850 is a serving size banner 1866, and a corresponding input prompt 1870. Similarly, a caloric intake banner 1868 and a corresponding input prompt 1872 are also included. Upon entering data into these prompts, the user may select the go link 1874 to apply the input data to the nutritional facts related to the product. Additionally, in at least one embodiment, if no data is entered into input prompts 1870, 1872, the default values will be automatically entered.

Figure 19:
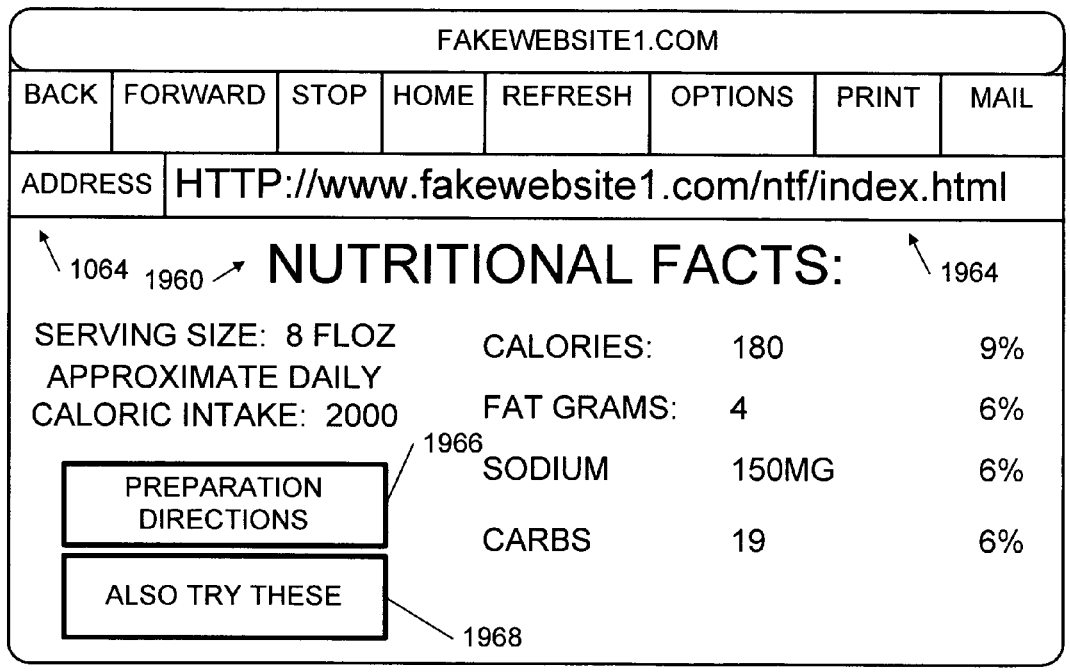
FIG. 19 is an exemplary screen shot of a nutritional facts display that may be presented to a user for displaying the nutritional facts of a product, responsive to entering the desired information in FIG. 18.

FIG. 19 is an exemplary screen shot of a nutritional facts display that may be presented to a user for displaying the nutritional facts of a product, responsive to entering the desired information in FIG. 18. Pursuant to entering the requested data in web page 1850 and selecting the go link, the user may be presented with web page 1960, which includes an address bar 1064 with unique URL 1964. Also included in web page 1950 is a nutritional facts banner 1960, and various facts regarding the nutritional value of the selected product. Included in this information is the data selected by the user from web page 1850 (FIG. 18). The nutritional data listed in web page 1950 includes calories, fat grams, sodium, and carbohydrates. Corresponding to the mass of each item, is the percentage of this item versus the daily allotment based on the selected caloric intake. As a nonlimiting example, the product selected includes 180 calories in an 8 fluid ounce serving. Based on a 2000 calorie per day diet, this product will consume 9% of the daily-allotted calories. Similar information is provided for other items. Also included in web page 1950 is a preparation directions icon 1966, and "an also try these icon" 1968.

Additionally, other information may be displayed, including but not limited to Surgeon General warnings related to the product being displayed. While this information may be displayed on the product packaging, various factors including the size of the package and size of the type font may prevent a product packaging from displaying the entire warning and relevant information to a user in a manner that can be easily found and deciphered.

Also, the displayed information may come from third party interest groups that wish to provide consumers with information about goods and/or services. The information may be related to the goods and/or services being sold such as a PETA® message to avoid animal byproducts in food, or the message could be essentially unrelated to the good such that a political constituency group wants to economically boycott a particular brand of soup because of the hiring practices or political activities of the soup company's management. Also, advertising information about other goods and/or services in the same or different retailers could be displayed. In general, a user may want to control the types of information displayed based on various settings such as but not limited to optional enablement of message from particular groups and/or subscriptions to lists of interest groups such as PETA® or another political group staging an economic boycott. Additionally, while some information may be required by law (such as Surgeon General warnings) and user control is disabled, control of other information may be disabled based on a retailer's or advertiser's desires.

One should note that the items listed in web page 1950, as well as other examples in this disclosure are meant as nonlimiting examples. Any other information may be included without diverging from the motivation of this disclosure.

Figure 20:
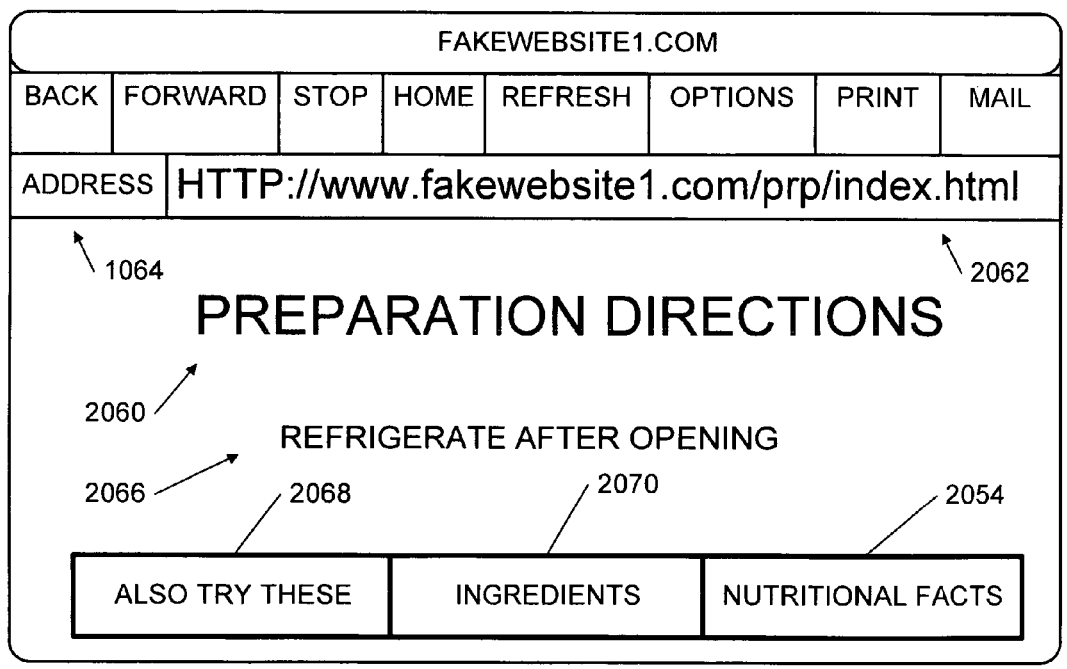
FIG. 20 is an exemplary screen shot of a preparation directions display that may be presented to a user for viewing preparation directions responsive to selecting the preparation directions link from FIG. 19.

FIG. 20 is an exemplary screen shot of a preparation directions display that may be presented to a user for viewing preparation directions responsive to selecting the preparation directions link 1966 from FIG. 19. Web page 2050 includes an address bar 1064 with a unique URL 2062, and a display banner 2060. Also included are the directions for preparing the product 2066. One should note that depending on the product selected, various preparation directions might be displayed. As a nonlimiting example, if the product being displayed is chicken, web page 2050 could display directions for baked chicken, fried chicken, grilled chicken, etc. Depending on the desired implementation, the directions displayed may be displayed as links to other displays that provide comprehensive preparation directions.

Alternatively, if a product requires assembly, or instructions for use, web page 2050 may convey this information as well. This functionality may allow the manufacturer to ship products without directions, or other documents typically included with the product. The consumer on the other hand, could have access to the information traditionally included with the product, as well as information that may not be available within the packaging. Also included in web page 2050 is an "also try these" link 2068, an ingredients link 2070 and a nutritional facts link 2054.

Figure 21:
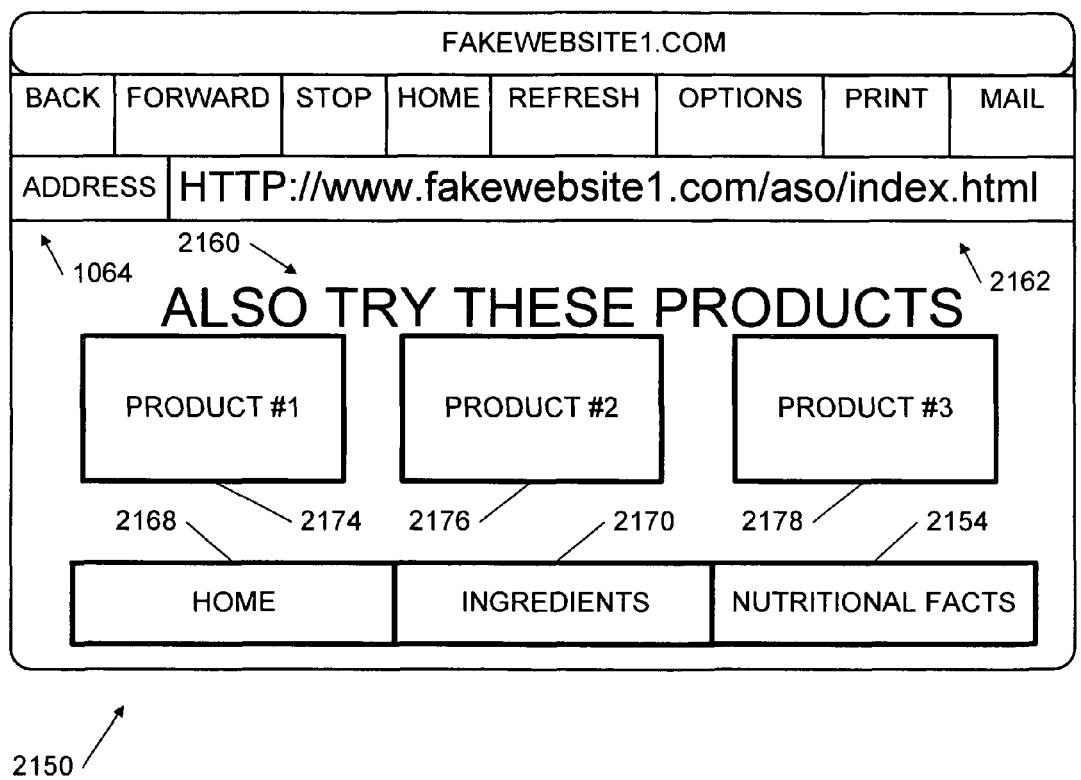
FIG. 21 is an exemplary screen shot of an "also try these" display that may be presented to a user for selecting other products that the user may have interest responsive to selecting the also try these link from FIG. 20.

FIG. 21 is an exemplary screen shot of an also try these display that may be presented to a user for selecting other products that the user may have interest, responsive to selecting the also try these link from FIG. 20. Web page 2150 includes the address bar 1064 with unique URL 2162 and "also try these products" banner 2160. Product #1 link 2174, Product #2 link 2176, and Product #3 link 2178 provide the user with information related to various products that the user may also have interest. The products listed in links 2174, 2176, and 2178 may be selected based on complementary products to the product being searched. As a nonlimiting example, if the current product is a pair of running shoes, the products listed in links 2174, 2176, and 2178 may include shoe laces, socks, running watches, water bottles, or other products that a runner may have interest. Also included in web page 2150 are links 2168, 2170, and 2154, which provide access to web pages 1350 (FIG. 13), 1650 (FIG. 16), and 1950 (FIG. 19), respectively.

Figure 22:
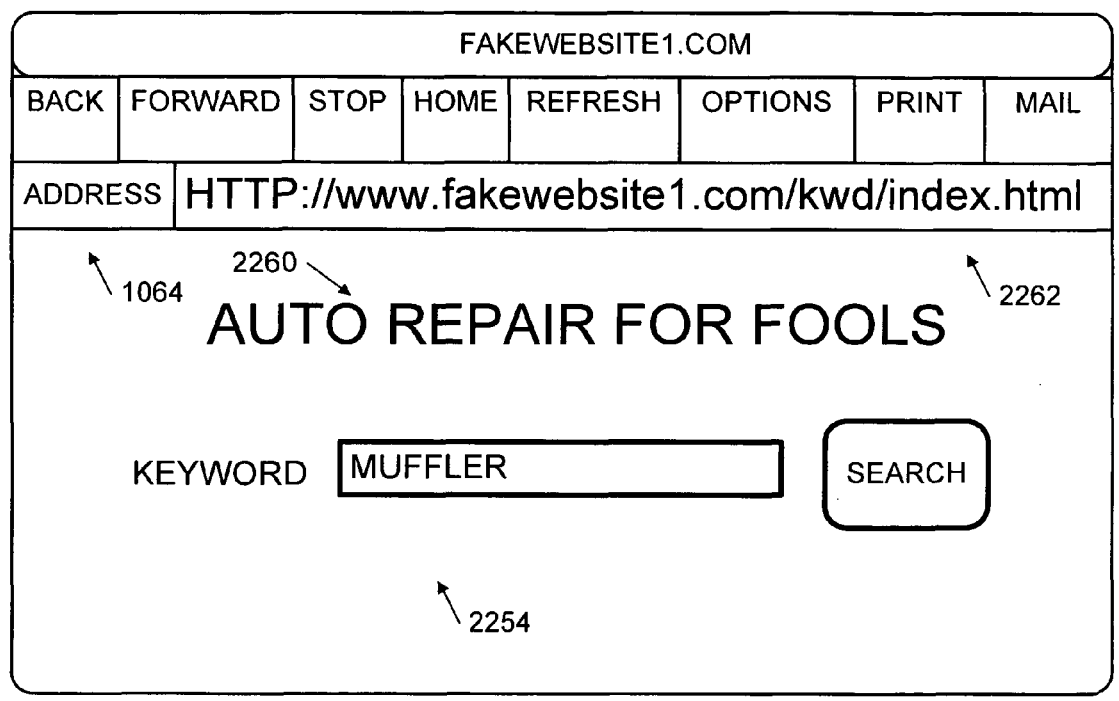
FIG. 22 is an exemplary screen shot of a keyword search display that may be presented to a user for performing a search on the product whose product identifier was inputted such as in FIGS. 14 and 15.

FIG. 22 is an exemplary screen shot of a keyword search display that may be presented to a user for performing a search on the product whose product identifier was inputted via FIGS. 14 and 15. In at least one embodiment, the host network 106 from FIGS. 1, 3, and 4 (or local host network 202 from FIG. 2) may provide searching capabilities of text. The searching capabilities may include the ability for a user who is looking for a book related to a specific topic to search the text of that book. Upon finding the keyword searched within the text of the desired book, the host network 106 (or local host network 202) could communicate textual data related to an excerpt where the term was found.

As illustrated in FIG. 22, web page 2250 includes the address bar 1064 with unique URL 2262. Also included in web page 2250 is an "auto repair for fools" banner 2260 and an input prompt 2254. In this scenario, a user may enter a bookstore, or other retail establishment, and input the product identifier for the book "Auto Repair For Fools" into a user device. Upon inputting the product identifier, the user device 102, 104 may display web page 2250. One should note that although web page 2250 is displayed as part of a web site, there is no constraint on the present disclosure to limit this embodiment to a web-based configuration. On the contrary, this embodiment, as well as other embodiments discussed in this disclosure, is intended to operate with or without the Internet.

Figure 23:
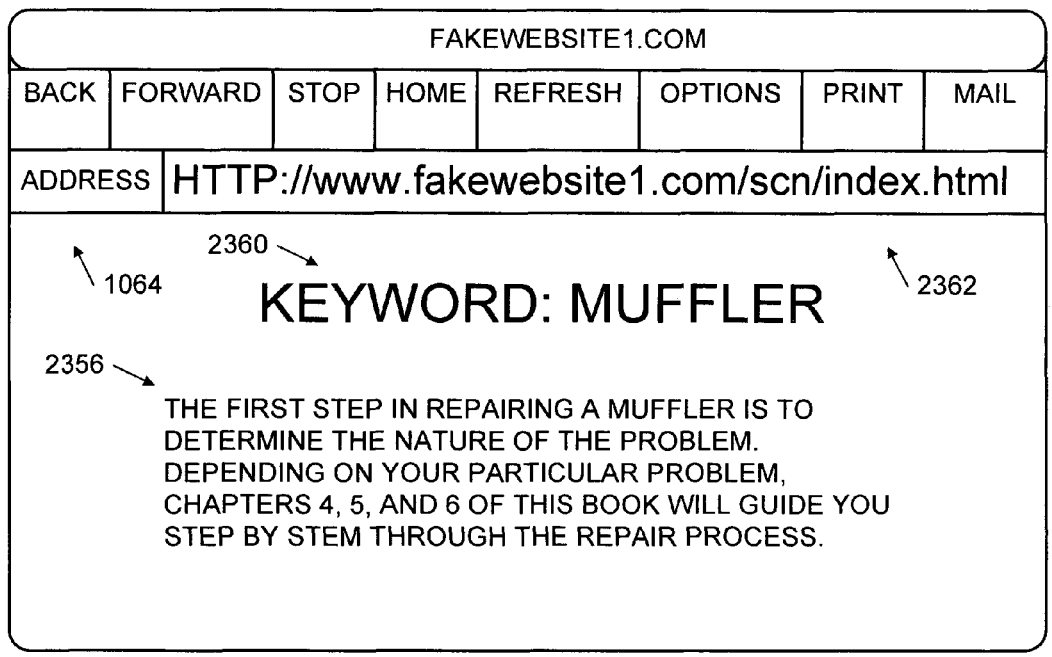
FIG. 23 is an exemplary screen shot of a search results display that may be presented to a user for displaying search results responsive to searching the keyword from FIG. 22.

FIG. 23 is an exemplary screen shot of a search results display that may be presented to a user for displaying search results responsive to searching the keyword from FIG. 22. As illustrated, web page 2350 includes address bar 1064 with unique URL 2362, and keyword banner 2360. Also included in web page 2350 is an excerpt 2356 displayed pursuant to the search conducted in FIG. 22. As discussed above, the excerpt 2356 may include actual text within the book searched. This allows the user to determine whether the book searched is adequate for the user's desires.

One should note that although the embodiments described with regard to FIGS. 22, 23 are directed to searching a book, this is but a nonlimiting example, as other forms of media may also be searched, including but not limited to text within magazines, and newspapers. Also contemplated in this disclosure is the ability to search images, video, and sound recordings in order to present the user with information about the relevancy of the searched product. More specifically, a user may input a product identifier and input a keyword searching for an image. The image may be linked to one or more keywords. If the user inputs the appropriate keyword, the image can be displayed.

Alternatively, the user may input an image via upload, or other similar means. Through image recognition algorithms known in the art, the user can search information related to that image. If the product is a book and similar images appear, this data can be communicated to the user device 102, 104. If textual data appears in the product that relates to the image, that text may be displayed. As a nonlimiting example, a user may want a book that describes a painting. The user can input the product identifier into the user device 102, 104, along with an image file of the described painting logic in the user devices 102, 104 or the host network 106, 202 or both may recognize the painting. A search may be performed regarding whenever an image of the painting is present in the book, or whenever the painting is discussed. Similar embodiments with respect to audio and video search criteria are also contemplated.

Figure 24:
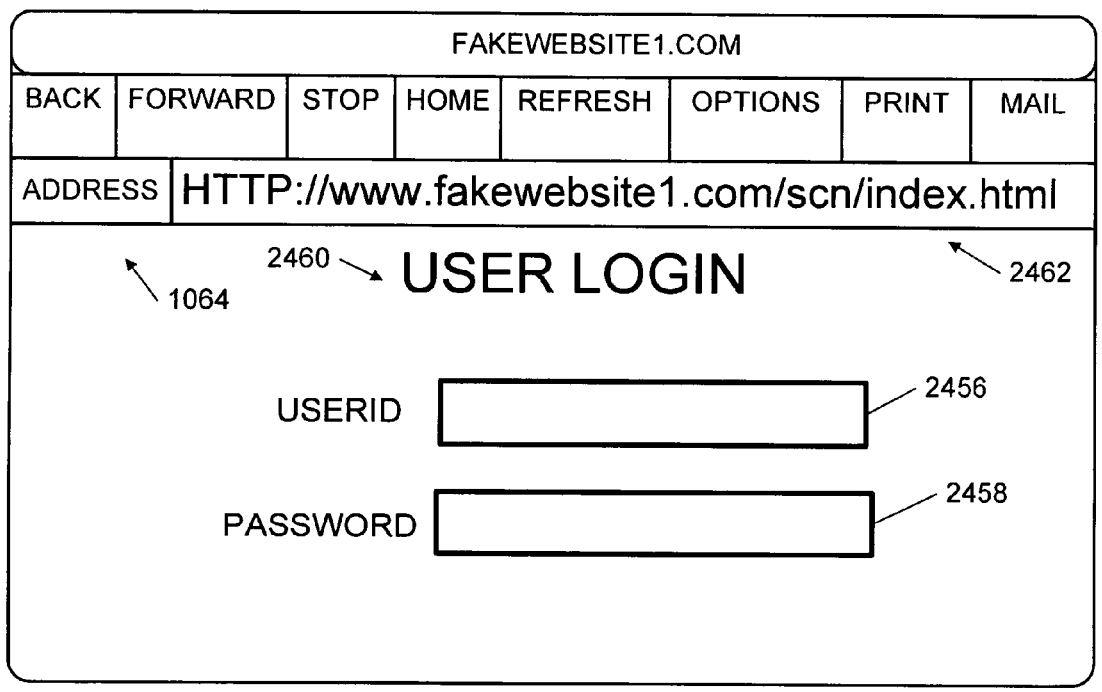
FIG. 24 is an exemplary screen shot of a user login display that may be presented for inputting user information responsive to the configurations of FIGS. 1, 2, 3, and 4.

FIG. 24 is an exemplary screen shot of a user login display that may be presented to a user for inputting user information pursuant to the configurations of FIGS. 1, 2, 3, and 4. As illustrated, web page 2450 includes the address bar 1064 with unique URL 2462, and a user login banner 2460. Also included are USERID and password input prompts 2456 and 2458, respectively. This implementation may enable the data network 106, 202 to customize the information provided to the user based on user identity. As a nonlimiting example, if a user frequently purchases goods from a retailer, the login process could help the user identify sales, related products, and other helpful information. While the login process does not necessarily require the user to input a USERID and password each time the user accesses the data network 106, 202, some authentication process may be desired.

Figure 25:
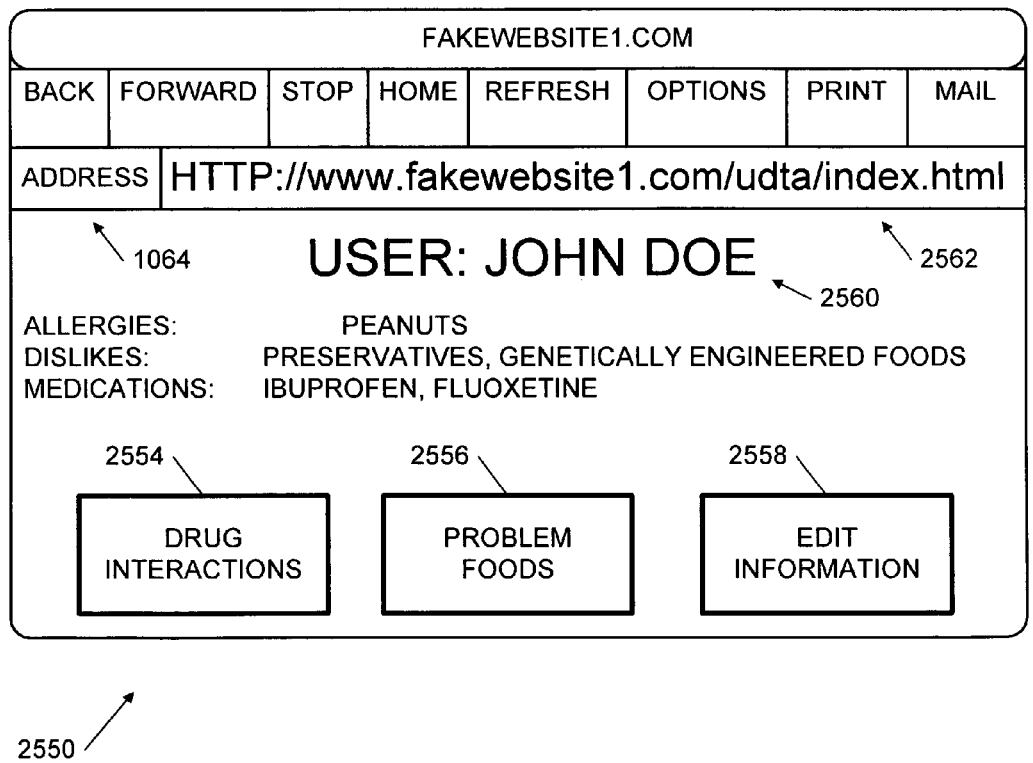
FIG. 25 is an exemplary screen shot of a drug interactions display that may be presented for displaying a user's preferences responsive to entering security information, such as but not limited to the USERID and password from FIG. 24.

FIG. 25 is an exemplary screen shot of a display that may be presented for displaying the user's preferences responsive to entering the USERID and password from FIG. 24. As illustrated, web page 2550 includes the address bar 1064 with unique URL 2562, and USERID banner 2560. In web page 2550, various information may be displayed to the user for viewing and changing. In web page 2550 information such as allergies, dislikes, and medications are displayed. This information can be used to customize recommended products, and to warn the user if certain products contradict with the user's settings. Also included in web page 2550 are drug interactions icon 2554, problem foods link 2556, and edit information link 2558.

Figure 26:
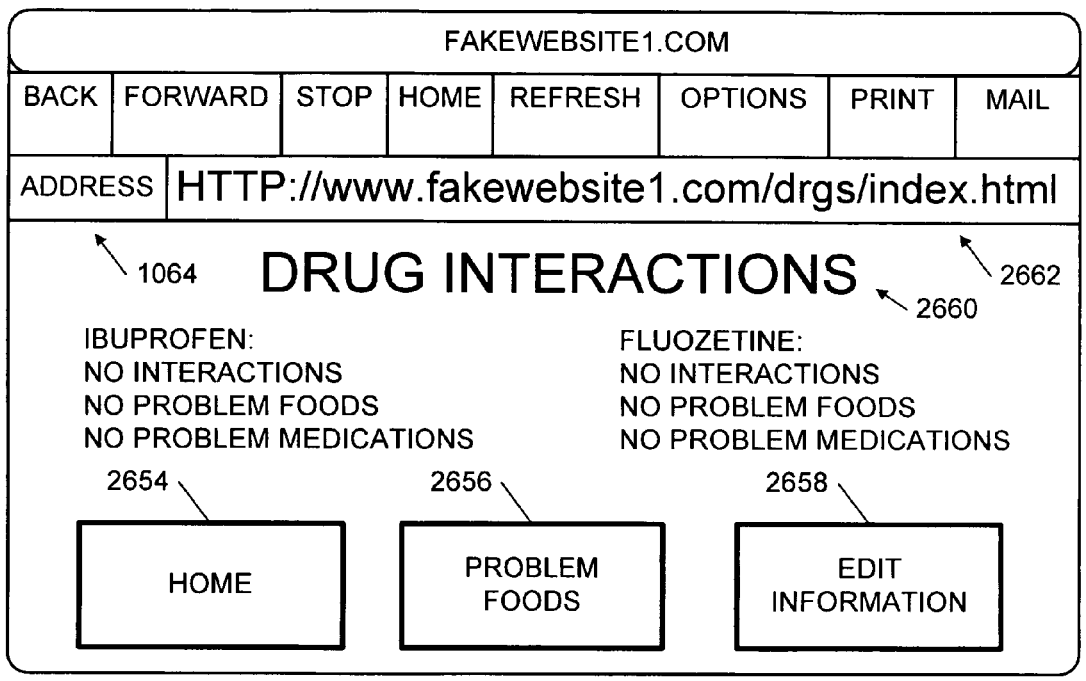
FIG. 26 is an exemplary screen shot of a drug interactions display for a user, responsive to selecting the drug interactions link from FIG. 25.

FIG. 26 is an exemplary screen shot of a drug interactions display for the user, responsive to selecting the drug interactions link 2554 from FIG. 25. As illustrated, web page 2650 includes address bar 1064 with unique URL 2662. Also included is a drug interactions banner 2660. Listed on web page 2650 are a list of the medications that the user has identified, along with interactions, problem foods, and problem medications. More specifically, the interactions indicator may identify ingredients or drugs that may interact with the listed medication and the potential interaction that cause. The problem foods indicator may list foods that contain the ingredients listed in the interactions list. The problem medications may identify medication products that may include drugs listed that may interact with the listed medication.

As a nonlimiting example, if peanut oil is indicated to interact with Ibuprofen, peanut oil can be listed next to the interactions indicator. Next to the problem foods indicator, peanut butter, peanut butter cups, etc. can be listed. As an supplemental nonlimiting example, if pseudoephedrine were indicated to interact with fluozetine, pseudoephedrine would be listed next to the interactions indicator along with the reactions that can occur. Additionally, next to the problem medications indicator, products such as Sudafed®, and others that include pseudoephedrine could be listed. Also included in web page 2650 are links 2654, 2656, and 2658, which provide access to the web page home, the problem foods web page, and the edit information web page, respectively.

Figure 27:
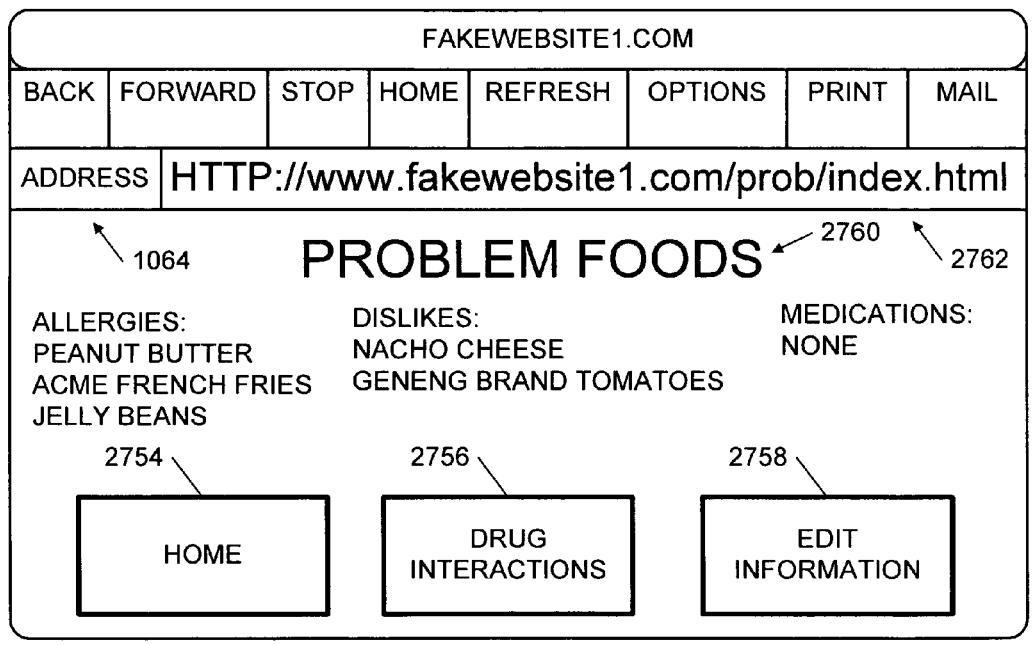
FIG. 27 is an exemplary screen shot of a display of problem foods for a user, responsive to selecting an option, such as problem foods link from FIG. 25.

FIG. 27 is an exemplary screen shot of a display of problem foods for a user, responsive to selecting an option such as problem foods link from FIG. 25. As illustrated, web page 2750 includes address bar 1064 with unique URL 2762 and a problem foods banner 2760. In web page 2750 allergies, dislikes, and medications are listed and include a list of foods that can be classified under one of these categories. In a previous nonlimiting example a user is allergic to peanuts, so problem foods may include all types of peanut butter, Acme brand french fries, and East Coast brand jellybeans. Additionally, because the user does not like processed food or genetically engineered foods, nacho cheese and GenEng brand tomatoes are also indicated. Also included in web page 2750 are a home link 2754, a drug interactions link 2756, and an edit information link 2758.

One should note that the information displayed in FIGS. 25, 26, and 27 is the type of information that can be useful to a user when shopping for or purchasing a product. As a nonlimiting example, if the user questions whether a product will interact with medications he or she is taking, the user can input the product identifier into the user device 102, 104 and view the results based on the medications stored. The information may be stored in either the user device 102, 104 or at the host network 106 or local host network 202 (which can be denoted as host network 106, 202). As an additional nonlimiting example, if the user does not input the product identifier of the product, but instead purchases the product, the user device can be configured to automatically receive data regarding the purchased items. Additionally, a function can be executed that determines if any of the purchased products have been flagged by the user. If a flagged product is purchased, notification can be sent to the user.

Figure 28:
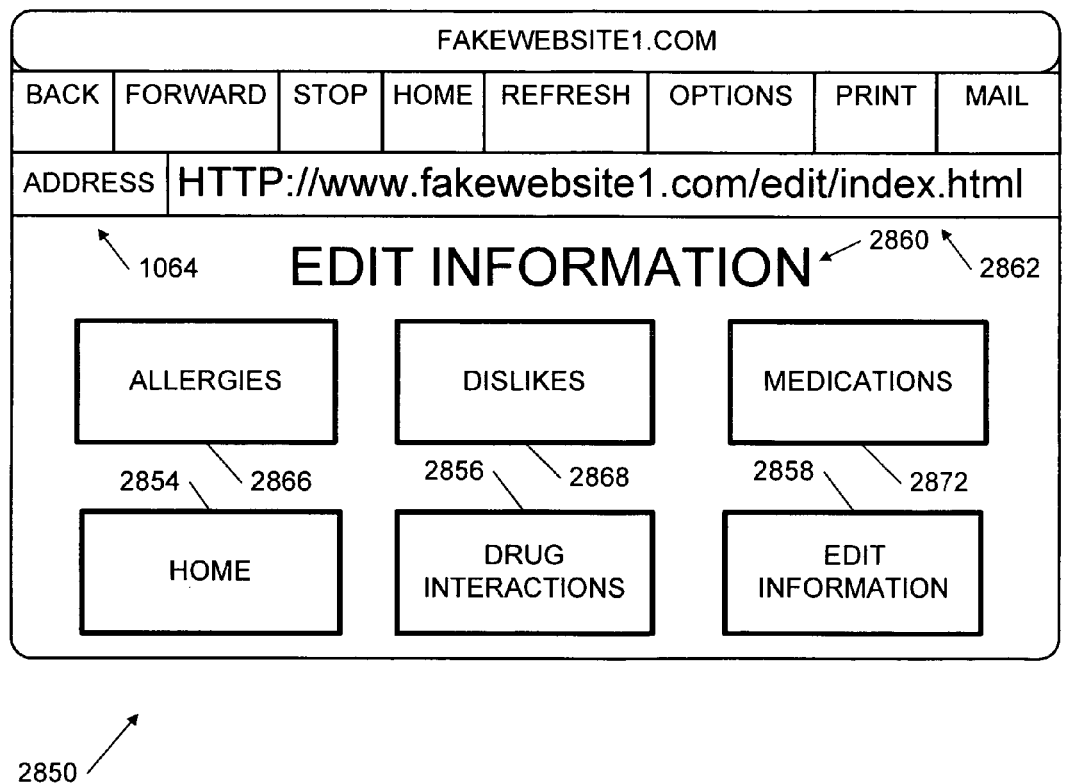
FIG. 28 is an exemplary screen shot of an edit information display for a user to edit personal information, responsive to selecting an edit information link such as the link from FIG. 25.

FIG. 28 is an exemplary screen shot of an edit information display for a user to edit personal information, responsive to selecting the edit information link such as the link from FIG. 25. As illustrated, web page 2850 includes address bar 1064 with unique URL 2862. Also included in web page 2850 is an edit information banner 2860. The web page 2850 may also include links 2866, 2868, and 2872, which may provide an option to edit user information regarding allergies, dislikes, and medications, respectively. Additionally home link 2854, drug interactions link 2856, and edit information link 2858 are also included in web page 2850.

Figure 29:
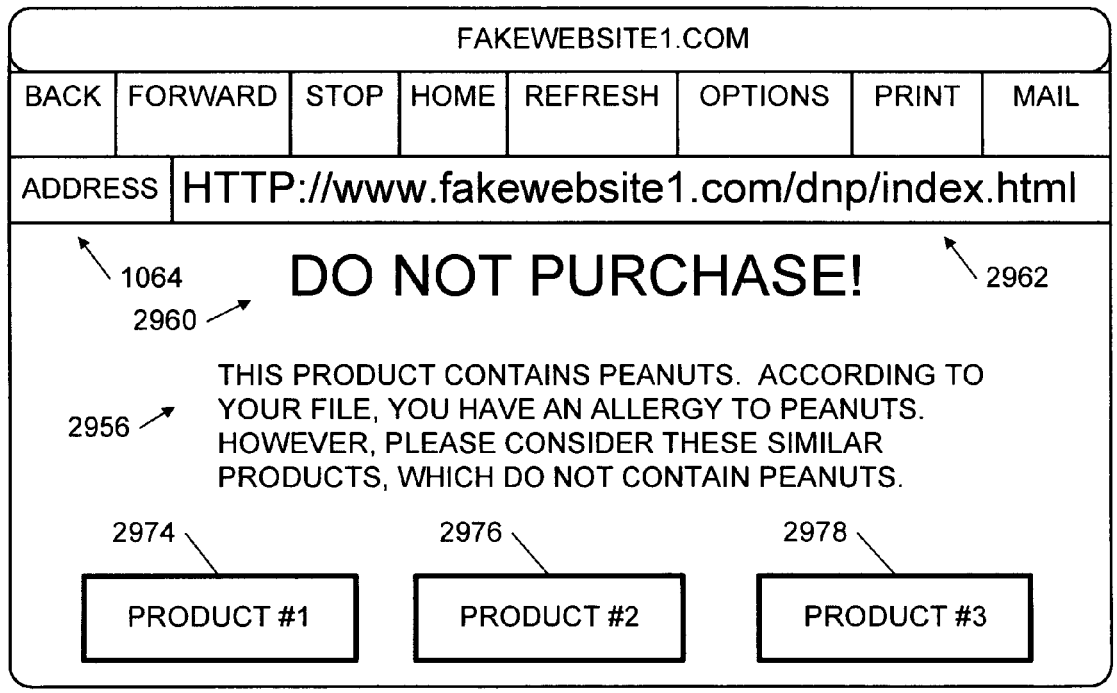
FIG. 29 is an exemplary screen shot of a "do not purchase display" that may be presented for warning a user that the product identifier that can be entered such as illustrated in FIGS. 14 and 15 refers to a product that contains undesired ingredients.

FIG. 29 is an exemplary screen shot of a do not purchase display that may be presented for warning a user that the product identifier that can be entered such as illustrated in FIGS. 14 and 15 refers to a product that contains undesired ingredients. As illustrated, web page 2950 includes address bar 1064 and unique URL 2962. Also included is a do not purchase banner 2960, and warning verbiage 2956 indicating that the product should not be purchased because of an identified problem. Also included in web page 2950 are product #1 link 2974, product #2 link 2976, and product #3 link 2978. These links can be configured to provide the user an option for similar products that do not include the problem ingredients. As a nonlimiting example, warning verbiage 2956 indicates that the current product includes peanuts. If the current product is East Coast Brand JellyBeans, then product #1 link could lead the user to West Cost Brand Jelly Beans, which do not contain peanut products. Similarly, product #2 link 2976 and product #3 link 2978 may include similar information.

Figure 30:
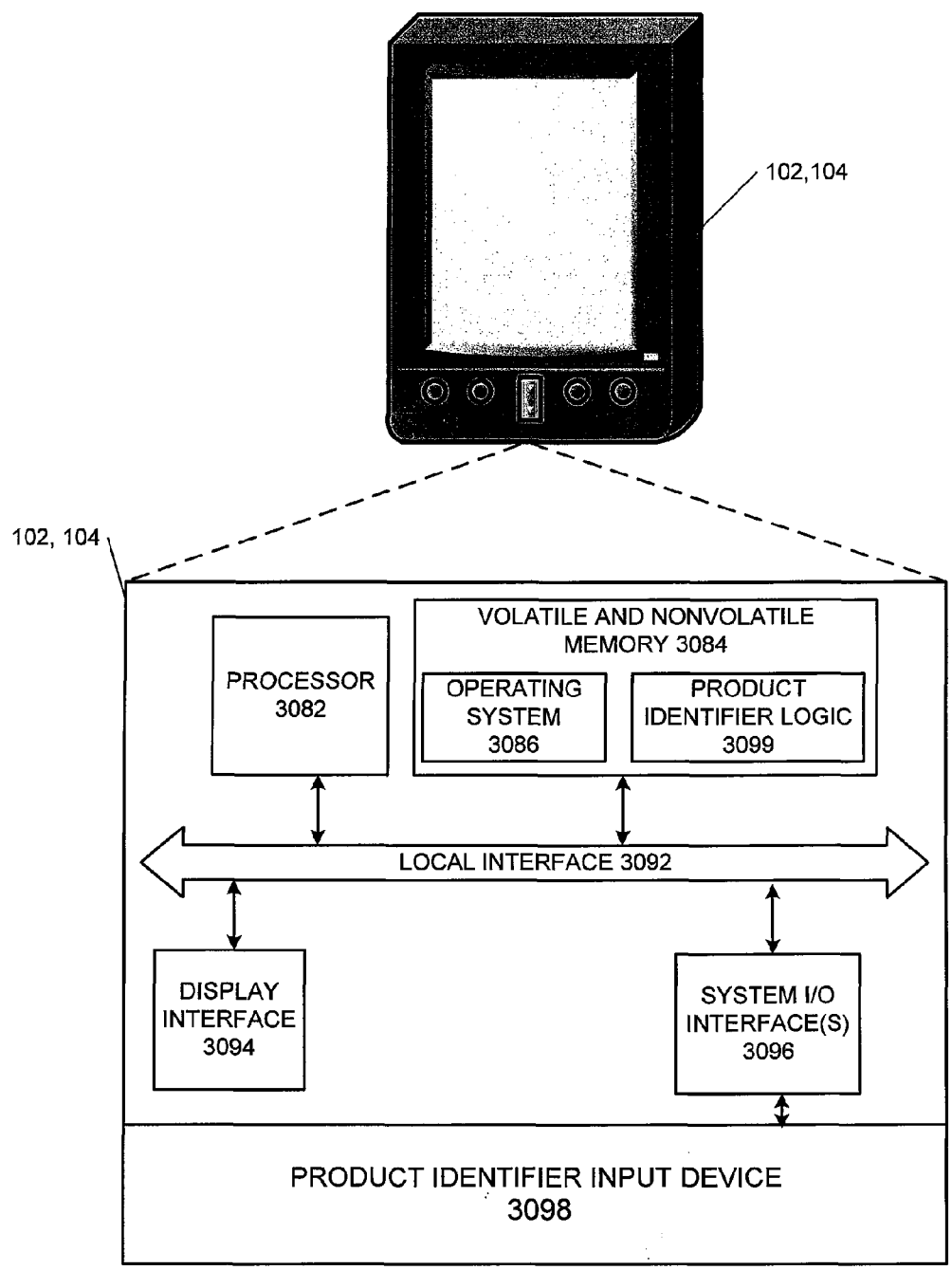
FIG. 30 is a detailed illustration of a device that may be used to access product information from FIGS. 1, 2, 3, and 4.

FIG. 30 is a detailed illustration of a device that may be used to access product information from FIGS. 1, 2, 3, and 4. One should note that while wireless user device 104 is depicted, any programmable device that can be configured for the functionality described herein might be used. As illustrated in FIG. 30, wireless user device 104 includes a processor 3082 coupled to a local interface 3092. Also coupled to the local interface 3092 are a display interface 3094, system input/output interface(s) 3096, a test-input interface(s) 3097, a test output interface(s) 3098, and a volatile and nonvolatile memory 3084. Included in the volatile and nonvolatile memory 3084, which can include an operating system 3086 and product identifier logic 3099.

Additionally, in at least one embodiment wireless user device 104 includes a product identifier input device 3099 coupled to the system input/output interface(s) 3096. The product identifier input device 3099 can take many forms including, but not limited to a UPC scanner device, a European Article Numbering (EAN) scanner device, an RFID input device, an Electronic Program Code (EPC) scanner device, an image scanner device, and a keyboard device. The UPC scanner device can be configured to read 1-dimensional UPC codes, 2-dimensional UPC codes, or both depending on the particular implementation of the device. Also included with user device 102, 104 can be a wired or wireless communications interface that can be configured to communicate data, including a product identifier.

In at least one embodiment, the user device 102, 104 includes an antenna, or other component configured for wireless communication. Alternatively, the user device 102, 104 may support wired communication within the retail establishment or at other locales. The device may be configured to communicate with a data network, such as local host network 202, from FIG. 2. In this nonlimiting example, user device has user information stored in volatile and nonvolatile memory 3084, or other data storage component. When the user enters a retail establishment, the wireless user device 102, 104 communicates with the local host network 202. The initial communication may include user login (manual or automatic). Upon determining user identity, the user device 102, 104 may communicate various user information (such as allergies, medications, previous purchases, etc.) to the local host network 202. With this information, the local host network 202 can communicate to the user device information regarding sales, new products of possible interest, an even the location of various goods in the store.

Depending on user settings, when the user wishes to inquire about a product, the user can implement the product identifier input device 3099. The information received from the product identifier input device 3099 may be compared with data in stored in user device 102, 104, or it may be communicated to data network 106, 202 for comparison with data stored therein. The information may then be used to determine information regarding the product, and this information can be compared with the user specific information regarding dislikes, allergies, medications, diet restrictions, etc.

As a nonlimiting example, due to religious beliefs a user may not eat pork products. The user may indicate this diet restriction to user device 102, 104, which may store or communicate this information to data network 106, 202, or both. Similarly, a user who is eating according to the "South Beach Diet" or other similar diet may want to reduce his or her intake of carbohydrates. In at least one embodiment contemplated in this disclosure, the user can input a restriction that "FLAGS" or indicates foods that contain more than a predefined amount of carbohydrates per serving. One should note that in at least one embodiment diet templates may be provided, which a user can automatically select a plurality of ingredients or products to be flagged. As a nonlimiting example, by selecting the "South Beach Diet" template, all products with carbohydrate counts above a certain threshold may automatically be flagged.

In the event that a user receives information regarding a product that is not "flagged" as a problem product, the user can manually define this product as such for future shopping. As a nonlimiting example, if the user eats tuna, but the Northern tuna company uses fishing nets that also catch dolphins, the user may manually define the Northern tuna company products as problem products, regardless of the ingredients. Similarly, if the Southern Shoe Company uses migrant workers in unfit conditions, the user may flag all products from the Southern Shoe Company as undesirable. Additionally, in at least one embodiment notification can be given if a product manufactured or sold by subsidiary of the undesirable company.

One should also note that depending on the particular product-identifying infrastructure implemented, different information may be stored and retrieved for the user. As a nonlimiting example, if UPC bar code information is implemented in a retail establishment, only product type information is available. Such an infrastructure may allow the user access to various information regarding the type of product scanned, however information regarding a specific item within a batch may not be available. If, on the other hand an infrastructure such as RFID is implemented, the user can gain access to the particular batch, and potentially each item within the batch. Consumers, manufacturers and retailers may utilize this information in any of a plurality of ways.

As a nonlimiting example, if a manufacturer determines that a certain batch is defective and needs to be recalled, the manufacturer can send a notification to data network 106, 202. Depending on the particular implementation, the data network 106, 202 can determine whether a user has purchased this item, and can forward the notification to the user device 102, 104, or through other means (e.g., postal mail, e-mail, phone call, etc.). Alternatively, the notification can be sent to all user devices 102, 104 coupled to the data network 106, 202, and the user devices 102, 104 can determine whether the user has purchased the defective product. Similarly, expiration dates on various food products may be communicated to the user based on batch information provided by the manufacturer, retailer, or other interested party.

In another nonlimiting example, the user may enter a retail establishment with user device 102, 104 communicating wirelessly to a host network, such as host network 106. The user may gain access to the host network 106 in any of a variety of ways including, but not limited to the implementations described in FIGS. 1, 3, and 4. In this scenario, the user device 102, 104 may maintain user information regarding allergies, dislikes, medications, etc. When the user enters the retail establishment, the user device may begin communicating with the host network. The host network may or may not also store the user's specific data and may begin communicating information regarding various products to the user without accessing the data from the user device. If the user is new to the host network's retail establishment, the user device 102, 104 may communicate the user's specific data to the host network 106. With this information the host network 106 may suggest products, and provide other information regarding previously purchased items. Additionally, when the user inputs a product identifier, this information can be communicated to the host network, which can then communicate data regarding that specific product. Depending on the scenario, all or a portion of this data may or may not be stored on the host network 106.

In another nonlimiting example, the retail establishment is coupled to a host network 106 similar to the configurations of FIGS. 1, 3, and 4. In this scenario, the user device does not have communicative access to the host network 106. The user may, however input a product identifier for each product that the user desires information. The product identifier can then be stored on the user device 102, 104. The user may then acquire product information regarding these products at a later time.

As an additional nonlimiting example, the user device 102, 104 can be in communication with an inventory system, either directly, via the data network 106, 202, or through other means. With this configuration, the user can input a product identifier, as before. The user can then determine the price of the product (or other information) from the inventory system. This information may alternatively be communicated from the inventory system to the data network 106, 202, which can store this information for access by the user device 102, 104.

In addition to the embodiments described above, the user device 102, 104 or data network 106, 202 (or both) can also be configured to calculate various other data regarding a product. Such information can include the price per unit, the price per ounce, the price per liter, the price per gallon, the price per pound, the price per slice, etc. Depending on the particular user's desires any of a number of calculations can be performed.

Additionally, the present disclosure contemplates an embodiment that includes translation services related to a product. A user can input a product identifier of a product whose packaging information is in a foreign language. In at least one implementation, a manufacturer could supply a translation to the data network 106, 202. The host network then forward the translated data to users who have designated that a translation is desired. In this implementation, the data network 106, 202 could provide translation services for those products whose manufacturers do not provide a translation.

As another addition or substitution, the user device 102, 104 may include logic to translate data received in a foreign language. Similarly, in each of these implementations the translation services may be substituted or complemented with services for handicapped users. Embodiments may include providing audio data related to a product for a user with poor eye sight; providing increased font sizes and alternate colors for users who have poor eye sight or for those who are color-blind; providing Braille for users with poor eye sight; etc.

As an additional nonlimiting example, the user can receive information regarding the wholesale price of the product. Similarly, the user can receive information regarding the retailer that sells that product for the cheapest price. More specifically, if a user inputs a product identifier, and requests a retailer with the cheapest price, the data network 106, 202 may communicate to the user device 102, 104 merchants (both traditional merchants and online merchants) who sell the product, and their prices. Additionally, the user can also be provided with information regarding distance to that retailer, travel times, etc. This information can help a user determine whether the savings is worth driving to the other retailer.

Alternatively, one should note that the user might also receive information related to pharmaceuticals that the user is currently taking. While a pharmacist may store information related to the medications a user is taking, if a user purchases medications at more than one pharmacist, each pharmacist might not have adequate information to determine possible complications related to the user taking various medications. In at least one embodiment, the user can input a product identifier related to the medications the user is taking (either prescribed, over the counter, or both). Depending on the particular implementation, the data network 106, 202 or the user device 102, 104 may store this information and communicate to the user if there are any potential problems regarding these drugs.

One should note that while various components and examples are depicted with regard to FIG. 30, these are but nonlimiting examples. Any other components or scenarios may be used to implement the functionality discussed herein.

Figure 31:
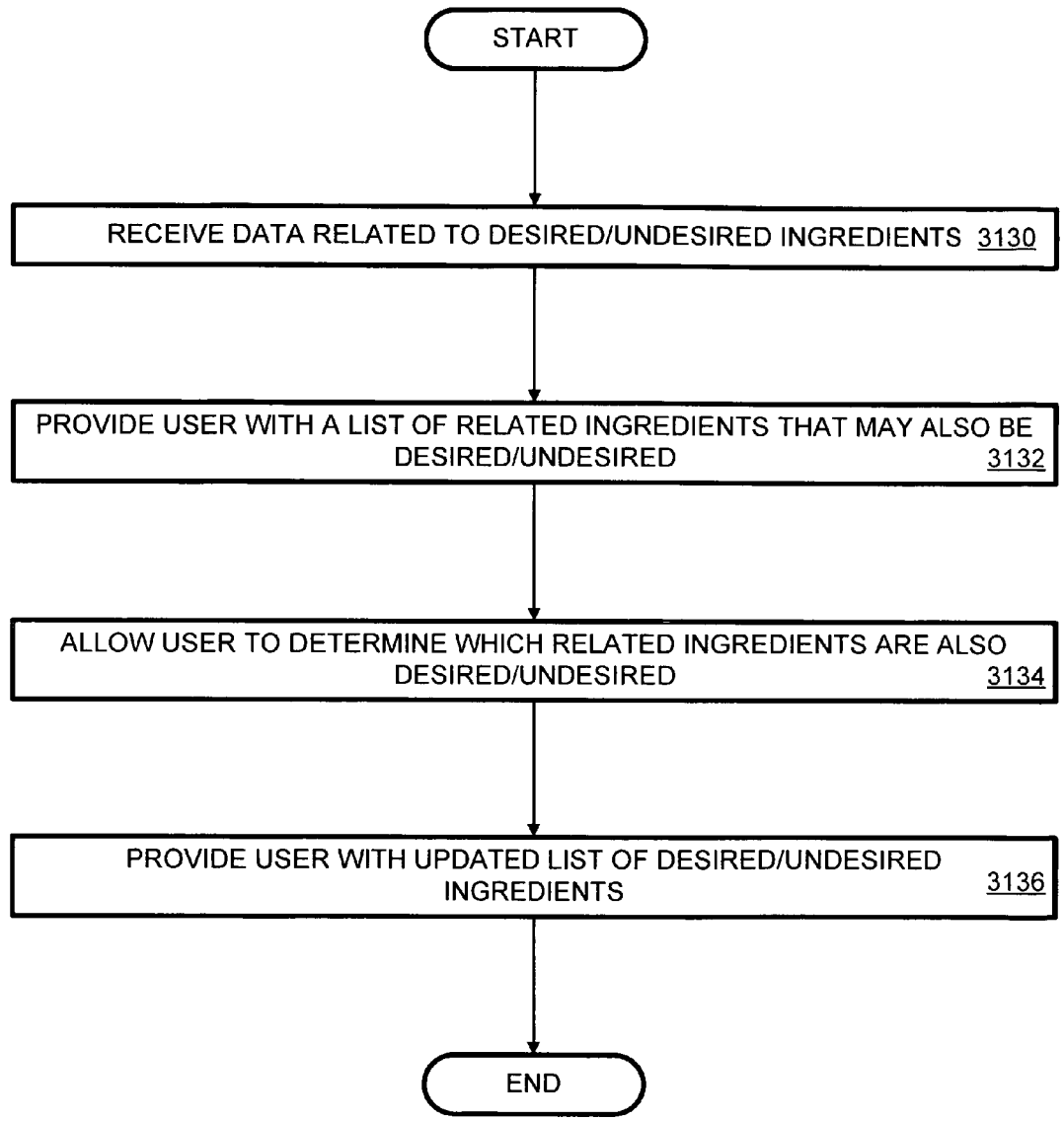
FIG. 31 is a flowchart illustrating exemplary steps that may be taken to enable a user to determine desired or undesired ingredients via the device from FIG. 30.

FIG. 31 is a flowchart illustrating exemplary steps that may be taken to enable a user to determine desired or undesired ingredients via the device from FIG. 30. The first step in the nonlimiting example of FIG. 31 is to receive data related to a desired or undesired ingredient (block 3130). In at least one embodiment the user device may receive this data from the user, while in at least one other embodiment the user device may receive this information from a host network. In at least one other embodiment the host network may receive this information from the user device 102, 104. One should note that depending on the specific implementation any of these situations might be implemented.

Once the data is received, the user may be provided with a list of related ingredients that also may be desired or undesired. Again this data may be included in logic in the user device, or it may come from a host network. In either event, the user may be presented with similar ingredients that the user would also deem desirable or undesirable (block 3132). This process can be completed for each desired and undesired ingredient received.

As a nonlimiting example, the user device 102, 104 may receive data that the user is allergic to peanuts. Logic in the user device may then provide the user with a list of other ingredients that the user may also be allergic. The list may include peanut oil, pecans, almonds, etc. which a user may also be allergic. The next step in this nonlimiting example is to allow the user to determine which of the related ingredients are also desired or undesired (block 3134). In the example above, if the user is allergic to peanuts, but he or she is not allergic to almonds, the user can deselect almonds as an undesired food. Alternatively, if the user is also allergic to pecans, the user can select pecans as an undesired food. Next, the user is provided with an updated list of the desired and undesired ingredients (block 3136).

As stated above, while the nonlimiting example discussed above related to the user device performing these actions, this is not intended as a limitation. Depending on the particular implementation, these steps can be performed by a data network 106, 202 that is in communication with a user device 102, 104.

Figure 32:
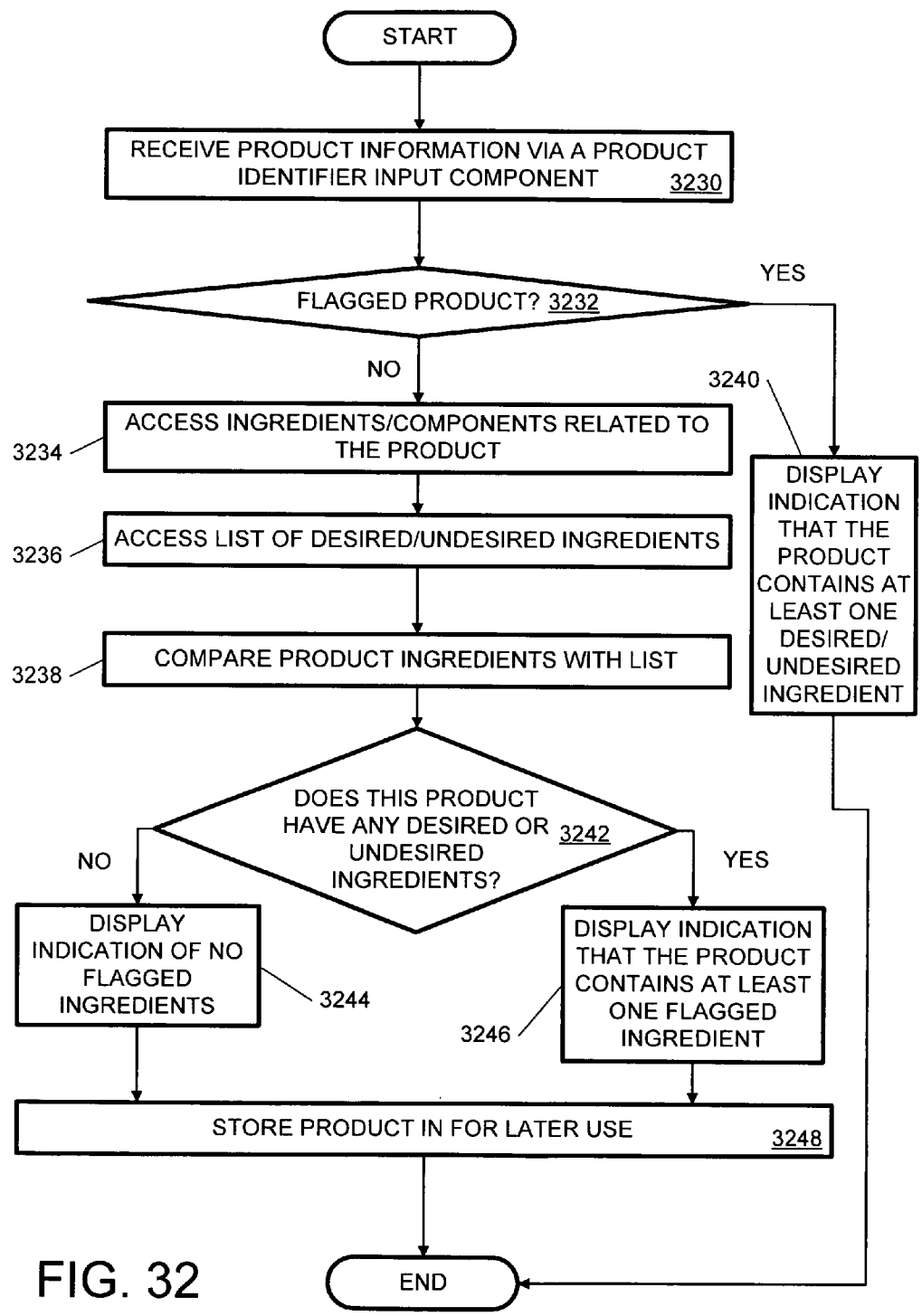
FIG. 32 is a flowchart illustrating exemplary steps that may be taken to provide a user with information related to an undesired ingredient via the device from FIG. 30.

FIG. 32 is a flowchart illustrating exemplary steps that may be taken to provide a user with information related to an undesired ingredient via the device from FIG. 30. The first step of the nonlimiting example of FIG. 32, is to receive a product identifier via a product identifier input component 3099 (block 3230). As stated above, the depending on the particular implementation, the user device 102, 104 may perform these operations, or a data network 106, 202 may perform these operations. The next step in this nonlimiting example is to determine if the product related to the received product identifier has been flagged as a desired or undesired product (block 3232). If the product has not been flagged as a desired or undesired product, the next step is to access the ingredients related to the product (block 3234).

Next, a list of desired and undesired ingredients is accessed (block 3236). Again this list may be stored on the user device, or at the host network. A compare function is executed to determine whether there are any ingredients in the product that the user has determined as being desired or undesired (blocks 3238, 3242). If the product does not have any desired or undesired ingredients, a display indication of this fact may be presented to the user (block 3248), and the product can be stored for later use (block 3244). If, on the other hand, the product includes ingredients that are desired or undesired, a display indication that the product contains a desired or undesired ingredient may be presented to the user (block 3246). The product may then be stored for later use (block 3248).

Referring back to block 3232, if the product has been flagged as including desired or undesired ingredients, a display indication to this fact can be presented to the user (block 3240). One should note that the steps described in the flowchart of FIG. 32 are nonlimiting examples of steps that can be taken.

Figure 33:
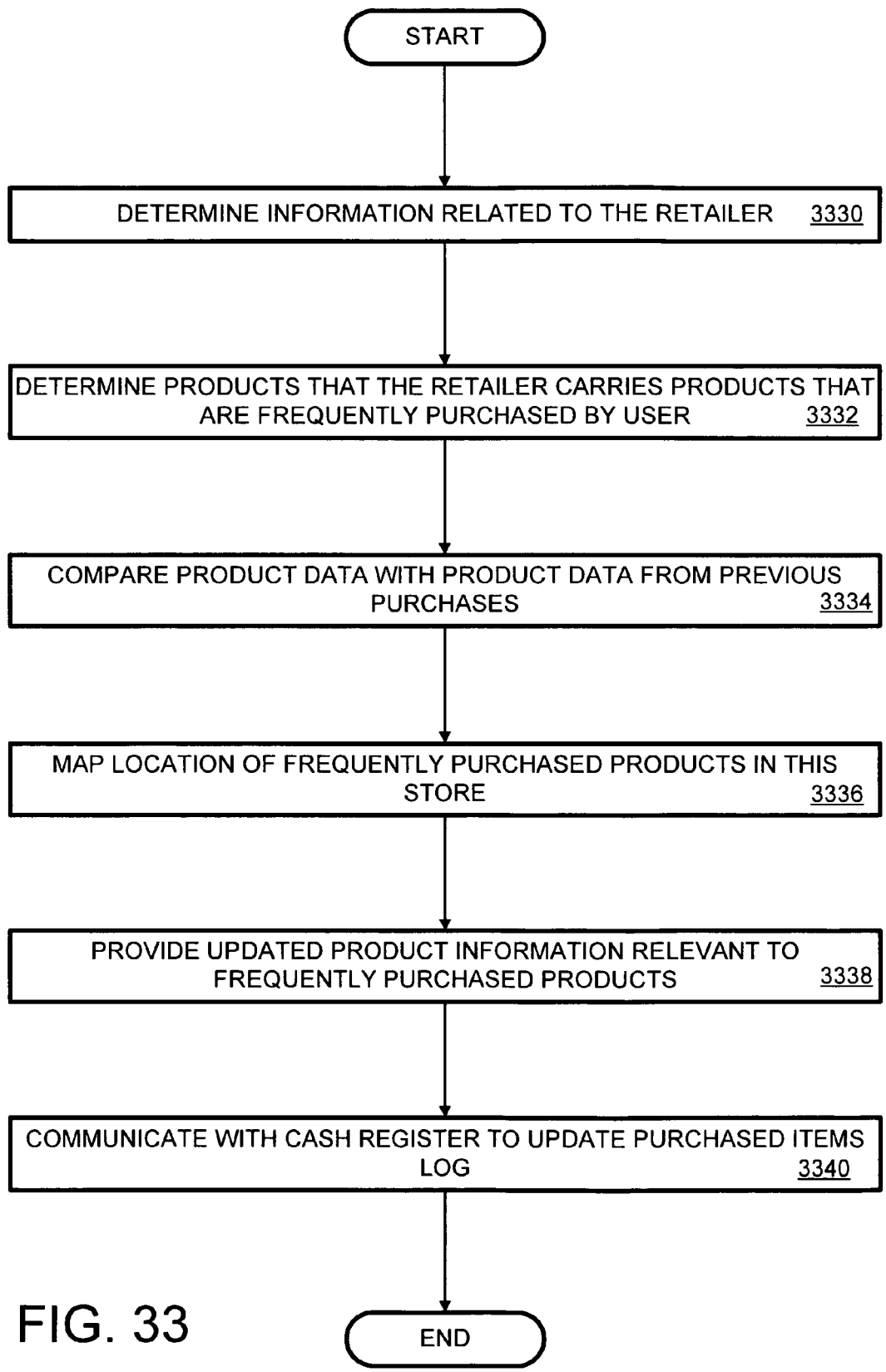
FIG. 33 is a flowchart illustrating exemplary steps that may be taken to provide a user with location information pursuant to a previously purchased product via the user device from FIG. 30.

FIG. 33 is a flowchart illustrating exemplary steps that may be taken to provide a user with location information pursuant to a previously purchased product via the device from FIG. 30. The first step in the nonlimiting example of FIG. 33 is to determine information related to the retailer (block 3330). In at least one embodiment a user may enter into a retail establishment with a user device, such as user device 102, 104. User device 102, 104 may be in communication with a data network 106, 202 and may receive information regarding the retail establishment. The user device 102, 104 may then access a data storage device, which may be located internally, on data network 106, 202, or on an external network to locate frequently purchased products. A determination may then be made as to whether the retailer carries products that are frequently purchased by the user (block 3332).

Purchase information may be received in a plurality of ways at least one of which includes the user device communicating with a host network 106, 202 at the time of purchase. When the user purchases a product, the product information is stored as being purchased. Other information such as date of sale, place of sale, quantity, etc. may also be recorded. This information may be added to information regarding previously purchased goods, to determine buying habits, spending habits, etc.

If the retail establishment sells products that the user frequently purchases, the user may then be provided with the location of these products in the store. As an alternative, the user may have product information stored such that when the user enters the retail establishment, he or she may then be provided with a map of the product's location. This feature may be beneficial when the user enters a retail establishment for the first time or when the user is purchasing a new product in this retail establishment for the first time.

The next step of this nonlimiting example is to compare product data with product data from previous purchases (Block 3334). This comparison can be used to determine buying habits, how much the user spent, etc. Next, a map is created that includes the location of a product in the store (Block 3336). Along with this map, the user can be provided with product information regarding frequently purchased products (Block 3338). Finally, a communication with the cash register (or other device that indicates products purchased) updates a log of products the user purchases (Block 3340). In at least one embodiment, the user may also update this log manually.

Figure 34:
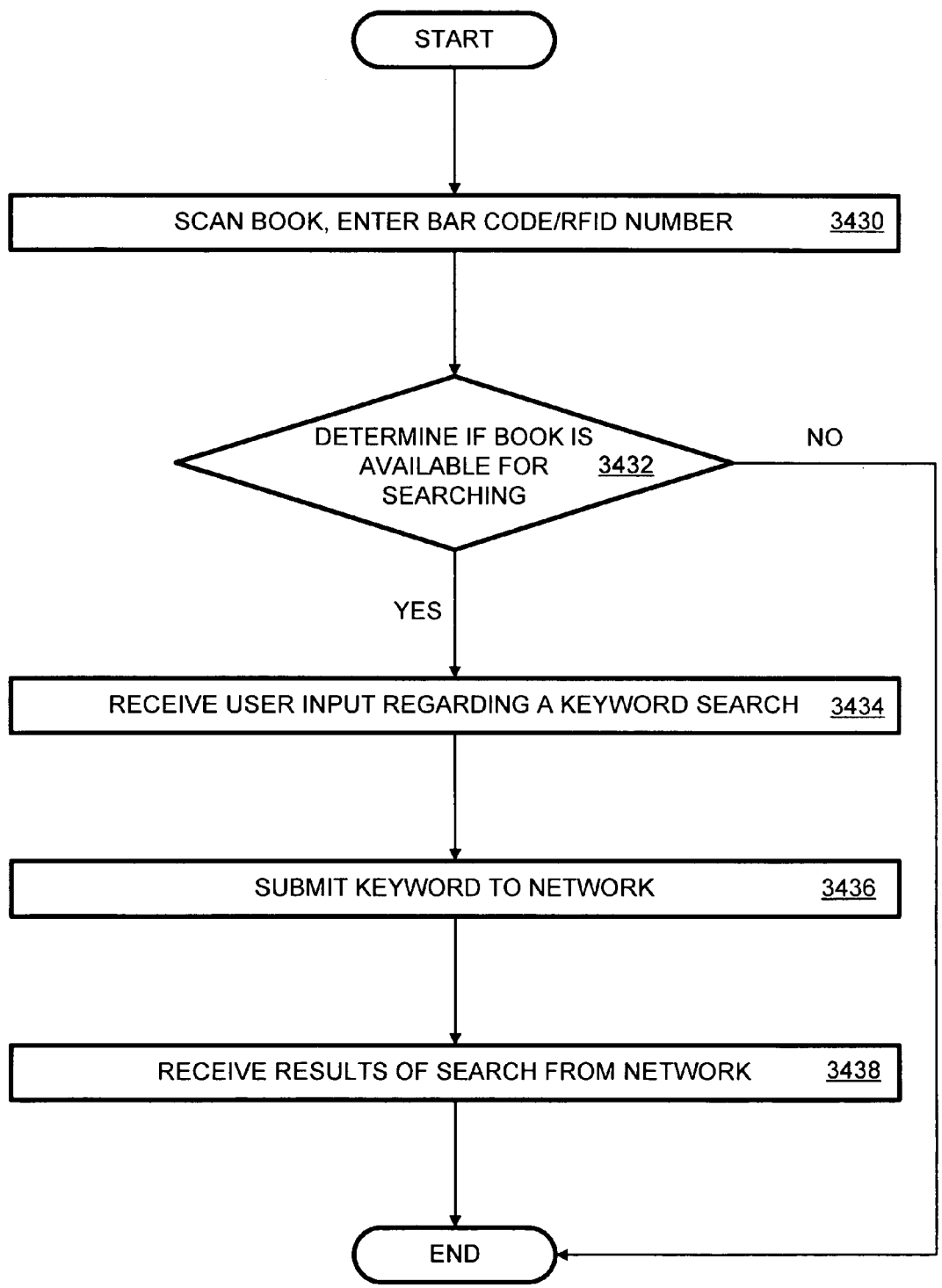
FIG. 34 is a flowchart illustrating exemplary steps that may be taken in providing information to a user related to a search performed with the device from FIG. 30.

FIG. 34 is a flowchart illustrating exemplary steps that may be taken in providing information related to a search performed with the device from FIG. 30. In at least one nonlimiting embodiment, a user can enter a bookstore, or similar retail establishment looking for literature on a specific topic. The books available may be directed to a broad topic area, or otherwise do not lend themselves to informing a potential purchaser of the exact details included within the literature. Regardless, the user potential purchaser may desire to search the text of the literature for keywords that could indicate that this book, magazine, or newspaper includes information on the desired topic. A search may be conducted using a wireless user device 104 in communication with a host network or local host network. The user can input the product identifier and a keyword. Based on this information, the user may be provided with actual verbiage from the book, magazine, newspaper, etc. that could indicate whether this piece of literature corresponds to the desired topic. In other embodiments, searches may be performed for audio, image or video based on a keyword or other data such as image, audio or video data.

As illustrated, the first step of the flowchart in FIG. 34 is to scan the book's product identifier or manually enter the product identifier (block 3430). Next, a determination is made whether the book is available for searching. In at least one embodiment, the retail establishment may not have every book electronically stored for searching (block 3432). In such a situation, a determination of whether the book is available can be made. If it is determined that the book is available for searching, the user device 102, 104 (or data network 106, 202 or both) can receive user input regarding a keyword search (block 3434). In a nonlimiting example discussed above, the user desired to search mufflers. The user may input the keyword "mufflers" to the user device via a keyboard, voice recognition, or other means of communicating this data to the user device 102, 104.

In at least one embodiment, the user device 102, 104 communicates the keyword data and product data to the host network or local host network (block 3436). The data network 106, 202 can then search the book to determine whether the term "mufflers" is present in the book being searched. If this keyword is present, the user device can receive an excerpt from the book that includes the searched term "mufflers" (block 3438). If, on the other hand, the book is not available for searching, the user may be presented with a display indicating that this option is not available.

It should be emphasized that many variations and modifications may be made to the above-described embodiments. All such modifications and variations are intended to be included herein within the scope of this disclosure and protected by the following claims.

The invention claimed is:

1. A user device for communicating product information, comprising:
   a product identifier input device configured to receive a product identifier for a selected product;
   a data storage device that stores:
   first logic that causes a processor of the user device to retrieve a previously determined user preference, the previously determined user preference being determined prior to receiving the product identifier for the selected product;
   second logic that causes the processor of the user device to retrieve product information associated with the product identifier from a data network servicing a plurality of retail stores, the data network being accessed from a local product server hosted within a first retail location, the data network also being accessible from a second local product server hosted within a second retail location, wherein the plurality of retail stores comprise different retail stores from different retail store chains and product information is allowed or denied amongst the different retail stores;
   third logic that causes the processor of the user device to compare the previously determined user preference with the product information; and
   fourth logic that causes the processor of the user device to, in response to a determination that the product information includes an element not allowed by the predetermined user preference, suggest an alternative product to the selected product,
   wherein the alternative product is verified to be sold at the first retail location when the data network is being accessed from the local product server hosted within the first retail location,
   wherein access to product information for products not sold at the first retail location is denied from being sent to the user device over the data network while the local product server hosted within the first retail location is used by the user device to access the data network, wherein access to product information for products sold at the first retail location is granted and allowed to be sent to the user device over the data network while the local product server hosted within the first retail location is used by the user device to access the data network,
   wherein access to product information for products sold at the second retail location is denied from being sent to the user device over the data network while the local product server hosted within the first retail location is used by the user device to access the data network, wherein access to product information for products sold at the second retail location is granted and allowed to be sent to the user device over the data network while the second local product server hosted within the second retail location is used by the user device to access the data network.

2. The user device of claim 1, further comprising fifth logic that causes the processor of the user device to provide a notification regarding whether the previously determined user preference relates to the at least a portion of the product information.

3. The user device of claim 1, wherein the product identifier input device includes at least one of the following: a keyboard, a mouse, a one-dimensional Universal Product Code reader, a two-dimensional Universal Product Code reader, a Radio Frequency Identification tag reader, European Article Numbering reader, an Electronic Program Code reader, and an image scanner.

4. The user device of claim 1, further comprising a wireless interface for the user device communicating wirelessly with the data network.

5. The user device of claim 1, wherein the user device includes at least one of the following: a personal computer, a telephone, a Personal Digital Assistant, a television, and a set-top box.

6. The user device of claim 1, further comprising a communications interface for the user device configured to communicate with the data network via the Internet.

7. The user device of claim 1, further comprising fifth logic that causes the processor of the user device to receive data associated with the location of the product related to the product identifier.

8. The user device of claim 1, further comprising fifth logic that causes the processor of the user device to provide an option to determine the previously determined user preference.

9. The user device of claim 1, wherein the previously determined user preference includes a list of allergies of the subscriber.

10. The user device of claim 1, wherein the previously determined user preference includes a previous purchase of the subscriber.

11. A method of providing product information, comprising:
    receiving a product identifier via a user device, the product identifier associated with a product;
    retrieving a previously determined user preference, the previously determined user preference being determined prior to receiving the product identifier for the product;
    utilizing the product identifier to retrieve product information related to the product from a data network servicing a plurality of retail stores, the data network being accessed from a local product server hosted within a first retail location, the data network also being accessible from a second local product server hosted within a second retail location, wherein the plurality of retail stores comprise different retail stores from different retail store chains and product information is allowed or denied amongst the different retail stores;
    comparing the previously determined user preference with the product information; and in response to a determination that the product information includes an element not allowed by the previously determined user preference, suggesting an alternative product to the product,
    wherein the alternative product is verified to be sold at the first retail location when the data network is being accessed from the local product server hosted within the first retail location,
    wherein access to product information for products not sold at the first retail location is denied from being sent to the user device over the data network while the local product server hosted within the first retail location is used by the user device to access the data network, wherein access to product information for products sold at the first retail location is granted and allowed to be sent to the user device over the data network while the local product server hosted within the first retail location is used by the user device to access the data network,
    wherein, access to product information for products sold at the second retail location is denied from being sent to the user device over the data network while the local product server hosted within the first retail location is used by the user device to access the data network, wherein access to product information for products sold at the second retail location is granted and allowed to be sent to the user device while the second local product server hosted within the second retail location is used by the user device to access the data network.

12. The method of claim 11, further comprising storing the previously determined user preference.

13. The method of claim 11, further comprising providing a user option to edit the previously determined user preference.

14. The method of claim 11, wherein the product information includes at least one of the following: product name, product price, product ingredients, product components, nutritional value, product instructions, product preparation directions, related products, sales data, and product retailer.

15. The method of claim 11, further comprising providing a notification regarding whether the previously determined user preference relates to the at least a portion of the product information.

16. The method of claim 11, wherein the previously determined user preference includes a spending habit of the subscriber.

17. A non-transitory computer readable medium, configured for providing product information, the computer readable medium storing a program that, when executed by a computer, causes the computer to perform at least the following:
    receive a product identifier via a user device, the product identifier related to a product;
    retrieve a previously determined user preference, the previously determined user preference being determined prior to receiving the product identifier for the product;
    utilize the product identifier to retrieve product information associated with the product from a data network servicing a plurality of retail stores, the data network being accessed from a local product server hosted within a first retail location, the data network also being accessible from a second local product server hosted within a second retail location, wherein the plurality of retail stores comprise different retail stores from different retail store chains and product information is allowed or denied amongst the different retail stores;
    compare the previously determined user preference with at the product information; and in response to a determination that the product information includes an element not allowed by the previously determined user preference, suggest an alternative product to the product, wherein the alternative product is verified to be sold at the first retail location when the data network is being accessed from the local product server hosted within the first retail location,
    wherein access to product information for products not sold at the first retail location is denied from being sent to the user device over the data network while the local product server hosted within the first retail location is used by the user device to access the data network,
    wherein access to product information for products sold at the first retail location is granted and allowed to be sent to the user device over the data network while the local product server hosted within the first retail location is used by the user device to access the data network,
    wherein, access to product information for products sold at the second retail location is denied from being sent to the user device over the data network while the local product server hosted within the first retail location is used by the user device to access the data network, wherein access to product information for products sold at the second retail location is granted and allowed to be sent to the user device while the second local product server hosted within the second retail location is used by the user device to access the data network.

18. The non-transitory computer readable medium of claim 17, the program further causing the computer to provide an option for a user to edit the previously determined user preference.

19. The non-transitory computer readable medium of claim 17, the program further causing the computer to store the previously determined user preference.

20. The non-transitory computer readable medium of claim 17, the program further causing the computer to receive data associated with the location of the product related to the product identifier.

21. The non-transitory computer readable medium of claim 17, the program further causing the computer to send a notification to a user regarding whether the previously determined user preference relates to the at least a portion of the product information.

22. The non-transitory The computer readable medium of claim 17, the program further causing the computer to communicate with the data network.

23. The non-transitory computer readable medium of claim 17, wherein the previously determined user preference includes a medication purchased by the subscriber.

* * * * *